(12) United States Patent
Clarke et al.

(10) Patent No.: US 11,420,757 B2
(45) Date of Patent: Aug. 23, 2022

(54) SYSTEMS AND METHODS FOR MULTI-MODULE CONTROL OF A HYDROGEN POWERED HYBRID ELECTRIC POWERTRAIN

(71) Applicant: Universal Hydrogen Co., Hawthorne, CA (US)

(72) Inventors: John-Paul Clarke, Austin, TX (US); J. Mark Cousin, Los Angeles, CA (US); Loris Gliner, Hawthorne, CA (US); Hao Chen Yu, Los Angeles, CA (US); Gregory Loboda, Huntington Beach, CA (US); Brian German, Atlanta, GA (US)

(73) Assignee: Universal Hydrogen Co., Hawthorne, CA (US)

( * ) Notice: Subject to any disclaimer, the term of this patent is extended or adjusted under 35 U.S.C. 154(b) by 0 days.

(21) Appl. No.: 17/402,415

(22) Filed: Aug. 13, 2021

(65) Prior Publication Data

US 2022/0055762 A1 Feb. 24, 2022

Related U.S. Application Data

(60) Provisional application No. 63/068,853, filed on Aug. 21, 2020.

(51) Int. Cl.
*H01M 8/04* (2016.01)
*B64D 31/00* (2006.01)
(Continued)

(52) U.S. Cl.
CPC ............. *B64D 31/00* (2013.01); *B64D 27/24* (2013.01); *B64D 33/04* (2013.01); *F04D 25/06* (2013.01); *H01M 8/04029* (2013.01); *H01M 8/04111* (2013.01); *H01M 8/04298* (2013.01); *H01M 8/04694* (2013.01); *H01M 8/04701* (2013.01);
(Continued)

(58) Field of Classification Search
CPC ......... H01M 8/04029; H01M 8/04111; H01M 8/04298; H01M 8/04694; H01M 8/04701; H01M 2250/20
See application file for complete search history.

(56) References Cited

U.S. PATENT DOCUMENTS

| 4,516,405 A | 5/1985 | Laskaris |
| 6,745,801 B1 | 6/2004 | Cohen et al. |

(Continued)

FOREIGN PATENT DOCUMENTS

| EP | 3421864 B1 | 1/2020 |
| GB | 914193 A | 12/1962 |

(Continued)

OTHER PUBLICATIONS

International Searching Authority, International Search Report and Written Opinion, PCT Patent Application PCT/US2021/032087, dated Aug. 25, 2021, 8 pages.

(Continued)

*Primary Examiner* — Olatunji A Godo
(74) *Attorney, Agent, or Firm* — Perkins Coie LLP

(57) ABSTRACT

The present disclosure provides systems and methods for a hydrogen-powered hybrid electric powertrain and the associated hydro-electro-aero-thermal management system (HEATMS).

9 Claims, 14 Drawing Sheets

(51) Int. Cl.
  *B64D 27/24* (2006.01)
  *B64D 33/04* (2006.01)
  *F04D 25/06* (2006.01)
  *H01M 8/04029* (2016.01)
  *H01M 8/04111* (2016.01)
  *H01M 8/04298* (2016.01)
  *H01M 8/04694* (2016.01)
  *H01M 8/04701* (2016.01)

(52) U.S. Cl.
  CPC ....... *B60L 2200/10* (2013.01); *B60L 2210/10* (2013.01); *H01M 2250/20* (2013.01)

(56) References Cited

U.S. PATENT DOCUMENTS

| | | | |
|---|---|---|---|
| 6,886,609 | B2 | 5/2005 | Cohen et al. |
| 7,641,068 | B2 | 1/2010 | Immel et al. |
| 8,523,105 | B2 | 9/2013 | Buchheit |
| 9,108,730 | B2 | 8/2015 | Grossman |
| 9,118,054 | B2 | 8/2015 | Gummalla et al. |
| 9,555,887 | B2 | 1/2017 | Grossman |
| 9,643,656 | B1 | 5/2017 | Hall et al. |
| 9,678,515 | B2 | 6/2017 | Lapena-rey et al. |
| 9,777,889 | B2 | 10/2017 | Leachman et al. |
| 9,873,408 | B2 | 1/2018 | Capizzo |
| 9,963,241 | B2 | 5/2018 | Schramm et al. |
| 10,040,569 | B2 | 8/2018 | Filangi et al. |
| 10,112,718 | B2 | 10/2018 | Knepple et al. |
| 10,131,430 | B2 | 11/2018 | Grossman |
| 10,422,478 | B2 | 9/2019 | Leachman et al. |
| 10,435,155 | B2 | 10/2019 | Grossman |
| 10,583,935 | B2 | 3/2020 | Hoffjann |
| 10,608,270 | B2 | 3/2020 | Autrusson et al. |
| 2002/0171236 | A1 | 11/2002 | Joitescu et al. |
| 2004/0163731 | A1 | 8/2004 | Eichelberger et al. |
| 2004/0206762 | A1 | 10/2004 | Iida et al. |
| 2005/0100767 | A1 | 5/2005 | Stolmar |
| 2008/0264551 | A1 | 10/2008 | Wood |
| 2012/0048862 | A1 | 3/2012 | Otsuka et al. |
| 2013/0288148 | A1* | 10/2013 | Kazuno ............. H01M 8/04619 429/444 |
| 2014/0263358 | A1 | 9/2014 | Espinosa-Ioza et al. |
| 2015/0183338 | A1 | 7/2015 | Lee et al. |
| 2016/0159492 | A1 | 6/2016 | Filangi, Jr. et al. |
| 2017/0327091 | A1 | 11/2017 | Capizzo |
| 2017/0341769 | A1 | 11/2017 | Haberbusch et al. |
| 2017/0373333 | A1* | 12/2017 | Kajiura ............. H01M 8/04917 |
| 2018/0111475 | A1 | 4/2018 | Wexler et al. |
| 2018/0151898 | A1 | 5/2018 | Knapp |
| 2018/0208463 | A1 | 7/2018 | Halsey et al. |
| 2018/0346330 | A1 | 12/2018 | Halsey et al. |
| 2019/0009917 | A1 | 1/2019 | Anton et al. |
| 2019/0032851 | A1 | 1/2019 | Adler et al. |
| 2019/0077521 | A1 | 3/2019 | Kelly et al. |
| 2020/0133286 | A1 | 4/2020 | Bellar et al. |
| 2020/0164985 | A1 | 5/2020 | Grossman |
| 2020/0180774 | A1 | 6/2020 | Rainville |
| 2020/0180940 | A1 | 6/2020 | Rainville |
| 2022/0009648 | A1 | 1/2022 | Clarke et al. |
| 2022/0074548 | A1 | 3/2022 | Clarke et al. |

FOREIGN PATENT DOCUMENTS

| | | |
|---|---|---|
| GB | 1322251 A | 7/1973 |
| GB | 2396851 A | 7/2004 |
| WO | 2018175349 A1 | 9/2018 |
| WO | 2020002462 A1 | 1/2020 |
| WO | 2020060488 A1 | 3/2020 |

OTHER PUBLICATIONS

International Searching Authority, International Search Report and Written Opinion, PCT Patent Application PCT/US2021/032090, dated Sep. 9, 2021, 9 pages.

International Searching Authority, International Search Report and Written Opinion, PCT Patent Application PCT/US2021/046027, dated Feb. 7, 2022, 23 pages.

International Searching Authority, International Search Report and Written Opinion, PCT Patent Application PCT/US2021/057385, dated Mar. 14, 2022, 15 pages.

* cited by examiner

SYSTEMS AND METHODS FOR MULTI-MODULE CONTROL OF A HYDROGEN POWERED HYBRID ELECTRIC POWERTRAIN

CROSS-REFERENCE TO RELATED APPLICATIONS

This non-provisional patent application hereby claims the benefit of and priority to U.S. Provisional Patent Application No. 63/068,853, titled SYSTEMS AND METHODS FOR MULTI-MODULE CONTROL OF A HYDROGEN POWERED HYBRID ELECTRIC POWERTRAIN, filed Aug. 21, 2020, which is incorporated herein in its entirety by reference thereto.

BACKGROUND

Vehicles may be operated using a fuel source. The fuel source may have a specific energy corresponding to an amount of energy stored or extractable per unit mass of fuel. The fuel source may be provided to various vehicles to enable such vehicles to generate energy and deliver power to a propulsion system for movement and transportation.

SUMMARY

Embodiments of the present technology provide systems and methods for multi-module control of a hydrogen-powered hybrid electric powertrain that overcomes drawbacks of the prior art and provides additional benefits. One aspect of the present technology provides a method for optimizing operation of an aerial vehicle having a hydrogen-powered hybrid electric powertrain. The method comprises providing hydrogen fuel to one or more fuel cell stacks, directing a first amount of air to the one or more fuel cell stacks powered by the hydrogen fuel and generating a first output of electrical power for use at least by an electric motor of the hydrogen-powered hybrid electric powertrain, and operating the electric motor using the generated electrical power, wherein the generated electrical power is provided to the electric motor without passing through or being stored in a battery.

The method also includes predicting one or more changes in an electrical power demand of the powertrain during operation of the electric motor, and controlling an amount of air flow to the one or more fuel cell stacks to direct a second amount of air to the one or more fuel cell stacks based at least in part on the one or more predicted changes in the electrical power demand of the powertrain, wherein the first amount of air is different than the second amount of air provided to the one or more fuel cell stacks. The second amount of air is provided to the one or more fuel cell stacks before occurrence of the predicted electrical power demand for generation of a second output of electrical power by the one or more fuel cell stacks at or before occurrence of the predicted electrical power demand of the powertrain, wherein the second output of electrical power is different than the first output of electrical power, thereby reducing a transient period for delivery of the electrical power to the electric motor of the powertrain.

The amount of air flow can be controlled in part by controlling mechanical power to one or more compressors that direct airflow toward the one or more fuel cell stacks. The compressors are powered at least partially by a peripheral electrical power unit. The second amount of air is provided to the fuel cell stacks at a time so the fuel cells provide sufficient electrical power to meet the predicted electrical power demand before the occurrence of the predicted demand of the electrical power output. The fuel cell stacks and the electric motor can be coupled to radiators for dissipating heat generated at least by the fuel cell stacks and the electric motor, and wherein the fuel cell stacks generate exhaust water when generating the generating electrical power. The exhaust water can be applied to the radiators for evaporative cooling for dissipation of the heat generated at least by the fuel cell stacks and the electric motor.

The method can include using at least one of (1) one or more sensors onboard the aerial vehicle and (2) data and automated observations from one or more other aircrafts, detecting a first set of atmospheric conditions in an aircraft-operating environment that indicates contrail formation from the aerial vehicle would occur upon release in the environment of exhaust water generated by one or more fuel cell stacks. The exhaust water onboard the aerial vehicle is temporarily stored to block the contrail formation as the aerial vehicle is navigating through the environment during first set of atmospheric conditions. A second set of atmospheric conditions can be detected in the environment in which it is unlikely to cause contrail formation from the aerial vehicle, the stored exhaust water is released from the aerial vehicle into the environment as the aerial vehicle is navigating through the environment without forming a contrail.

An embodiment of the present technology provides a thermally managed hydrogen-powered hybrid electric powertrain system for a hydrogen powered vehicle. The system comprises one or more fuel cell stacks comprising a plurality of hydrogen fuel cells configured to process hydrogen fuel to generate electricity, first thermal energy, and exhaust water. One or more primary electric power units receive the electricity generated by the one or more fuel cell stacks, wherein the electricity is provided from the one or more fuel cell stacks to the one or more primary electric power units without passing through or being stored in a battery, and wherein the one or more primary electric power units generates second thermal energy. One or more radiators are configured to receive and thermally dissipate the first and second heat, and one or more pumps are configured to transmit coolant to the one or more radiators. One or more fuel cell stacks are configured to transmit thermal energy to the one or more radiators, and a primary electric power unit is configured to transmit the thermal energy to the one or more radiators and receive electrical power from the one or more fuel cell stacks. A turbine receives first mechanical power from the one or more fuel cell stacks, a second compressor receives the mechanical power from the turbine and to direct first compressed air to the turbine and the one or more fuel cell stacks, a first compressor provides second compressed air to the second compressor, and a water distribution system receives the exhaust water generated by the one or more fuel cell stacks and to direct the exhaust water an exhaust outlet.

The system can further comprise a speed reducer coupled to the primary electric power unit and configured to transmit thermal energy to the pumps and receive mechanical power from the primary electric power unit, and a peripheral electric power unit that transmits the thermal energy to the one or more pumps, wherein the first compressor receives power from the peripheral electric power unit. The system can include a peripheral electric power unit that provides electrical power to the first compressor, and a battery that receives the electrical power generated from the fuel cell stacks and transmit the electrical power to the peripheral electric power unit, where in the battery does not provide electrical power to the primary electrical power unit. At least a portion of the exhaust water generated by the fuel cell stacks can pass through the turbine, and the turbine is configured to direct the exhaust water to the water distribution system. The water distribution system can have a spray bar forming the exhaust outlet and configured to direct the exhaust water onto the radiator.

The system in at least one embodiment comprises a hydrogen-powered powertrain and hydro-electro-aero-thermal management system (HEATMS) configured to control and manage thermal energy generated by the hydrogen-powered powertrain. The HEATMS is configured to predict one or more changes in an electrical power demand of the hydrogen-powered powertrain during operation of the primary electrical power unit. The HEATMS controls an amount of air mass flow rate to the one or more fuel cell stacks to direct an amount of air to the one or more fuel cell stacks based at least in part on the one or more predicted changes in the electrical power demand of the powertrain. The amount of air is provided to the one or more fuel cell stacks before occurrence of the predicted electrical power demand for generation of an output of electrical power by the one or more fuel cell stacks at or before occurrence of the predicted electrical power demand of the powertrain, wherein the output of electrical power is timed to reduce a transient period for delivery of the electrical power to the primary electrical power unit.

One aspect of the technology described herein is a method for optimizing operation of an aerial vehicle having a hydrogen-powered hybrid electric powertrain, the method comprising: predicting one or more changes or demands in an electrical power output of one or more hydrogen fuel cell stacks located on the aerial vehicle; and controlling an optimal amount of air mass flow rate at an inlet to the one or more fuel cell stacks based at least in part on the one or more predicted changes or demands to the electrical power output, thereby reducing a transient period or lag time for delivery of the electrical power output by the powertrain.

In some embodiments, the optimal amount of air mass flow rate to the fuel cell stacks is controlled in part by controlling mechanical power to one or more air compressors. In some embodiments, the one or more compressors are powered by a battery and a peripheral electrical power unit. In some embodiments, the optimal amount of air mass flow rate is controlled prior to an occurrence of the one or more changes or demands in the electrical power output. In some embodiments, the one or more changes or demands in the electrical power output are predicted based at least in part on one or more of the following: one or more inputs from a pilot of the aerial vehicle; a current, previous, or next position of the aerial vehicle; a flight path comprising a plurality of spatial coordinates; or atmospheric weather conditions.

Another aspect provided herein is a method for preventing or controlling contrail formation from an aerial vehicle, the method comprising: using at least one of (1) one or more sensors onboard the aerial vehicle and (2) data and automated observations from one or more other aircrafts, to detect a first set of atmospheric conditions in a first environment that causes or is likely to cause contrail formation from the aerial vehicle; and collecting and storing water generated by one or more fuel cell stacks onboard the aerial vehicle to reduce or eliminate release of the water while the atmospheric conditions exist to avoid contrail formation as the aerial vehicle is navigating through the first environment.

In some embodiments, the method further comprises using at least one of (1) the one or more sensors onboard the aerial vehicle and (2) the data and automated observations from the one or more other aircrafts to detect a second set of atmospheric conditions in a second environment that does not or is unlikely to cause contrail formation from the aerial vehicle, and releasing the stored water from the aerial vehicle into the second environment as the aerial vehicle is navigating through the second environment.

Another aspect provided herein is a method of de-icing an aerial vehicle, the method comprising: circulating heat generated by one or more fuel cell stacks to one or more parts of the aerial vehicle, and using the circulated heat to prevent ice formation at the one or more parts of the aerial vehicle. The one or more parts can comprise a wing or body of the aerial vehicle. The circulated heat can be used to prevent ice formation on the one or more parts of the aerial vehicle when the aerial vehicle is on the ground. The circulated heat can be used to prevent ice formation on the one or more parts of the aerial vehicle when the aerial vehicle is in flight.

Another aspect provided herein is a powertrain and thermal management system for a hydrogen-powered vehicle. The system comprises a hydrogen-powered hybrid electric powertrain and an associated hydro-electro-aero-thermal management system (HEATMS). The system can include one or more radiators; one or more pumps configured to transmit cooling fluid to the one or more radiators; one or more fuel cell stacks configured to transmit thermal energy to the one or more radiators; a primary electric power unit configured to transmit the thermal energy to the one or more radiators and receive electrical power from the one or more fuel cell stacks; a speed reducer configured to receive mechanical power from the primary electric power unit and transmit the thermal energy to the one or more pumps; a peripheral electric power unit configured to transmit power to a first compressor and the thermal energy to the one or more pumps; a turbine configured to receive the mechanical power (e.g., fluid power) from the one or more fuel cell stacks; a second compressor configured to receive the mechanical power from the turbine, and to receive the fluid from the first compressor; and a propeller configured to receive the mechanical power from the speed reducer.

In some embodiments, the first compressor is configured to receive a fluid from an inlet. The peripheral electric power unit can be configured to provide the mechanical power to a peripheral aircraft component. The system has a battery configured to receive the electrical power from the one or more fuel cell stacks and transmit the electrical power to the peripheral electric power unit. In some embodiments, the system has a water distribution system that receives water generated from the fuel cell stack and distributes the water onto or into the radiator or other heat exchanger to facilitate heat removal. The system can comprise a valve system and a fluid storage unit configured to receive and temporarily store a fluid that is output from the turbine and the fuel cell stack. In some embodiments, the fluid storage is configured to selectively transmit the fluid to an exhaust or for distribution to the radiator. In some embodiments, the system further comprises a deicing system configured to receive a fluid from the turbine. In some embodiments, the deicing system is configured to selectively transmit the fluid to an exhaust. In some embodiments, the turbine is configured to further transmit a fluid to an exhaust. In some embodiments, the speed reducer comprises a gearbox, a timing belt, an electromagnetic propeller clutch, or any combination thereof.

In some embodiments, the primary electric power unit has a peak power of greater than about 1,600 kW, and in some embodiments an operating range of approximately 1,600 kW-1,955 kW. In some embodiments, the peripheral power unit has a peak power of greater than about 400 kW, and in some embodiments an operating range of approximately 400 kW-489 kW. In some embodiments, the one or more fuel cell stacks have a specific power of greater than about 3 kW/kg, and in some embodiments an operating range of approximately 3 kW/kg-3.67 kW/kg. In some embodiments, the system is configured to reject at least about 2,000 kW from the one or more fuel cell stacks. In some embodiments, the system is configured to reject at least about 300 kW from the primary electric power unit or the peripheral electric power unit. In some embodiments, the fluid is water, air, or any combination thereof. In some embodiments, the cooling fluid is water, a coolant, an oil, or any combination thereof.

Another aspect provided herein is a non-transitory computer-readable storage media encoded with a computer program including instructions executable by a processor to create a hydro-electro-aero-thermal management system (HEATMS) application comprising: a first module configured to receive sensor data; a second module configured to determine, based on the sensor data: a peripheral electric power output; a primary electric power output; a battery power output; a pump power, a pump fluid flowrate, or both.

In some embodiments, the sensed data comprises an ambient air temperature, ambient air pressure, aircraft velocity, aircraft altitude, aircraft global positioning system (GPS) or other global navigation satellite system (GNSS) position, peripheral electric power unit output voltage, peripheral electric power unit output current, air inlet flow rate, air inlet temperature, air inlet pressure, air/water outlet flow rate, air/water outlet temperature, air/water outlet pressure, hydrogen inlet flow rate, hydrogen inlet temperature, hydrogen inlet pressure, speed reducer temperature, compressor inlet flow rate, compressor inlet temperature, compressor inlet pressure, compressor outlet flow rate, compressor outlet temperature, compressor outlet pressure, turbine inlet flow rate, turbine inlet temperature, turbine inlet pressure, turbine outlet flow rate, turbine outlet temperature, turbine outlet pressure, propeller rotational speed, radiator cooling fluid inlet temperature, radiator cooling fluid outlet temperature, a pilot control, or any combination thereof. In some embodiments, the second module is configured to determine the peripheral electric power output, the primary electric power output, the battery power output, the pump power, the pump fluid flow rate, or any combination thereof from the sensor data using a machine learning algorithm. In some embodiments, the machine learning algorithm is configured to determine a predicted flight event based on the sensed data, and wherein the second module is configured to determine the peripheral electric power output, the primary electric power output, the battery power output, the pump power, the pump fluid flowrate, or any combination thereof based on the predicted flight event. In some embodiments, the predicted flight event is a takeoff event, a cruise event, a climb event, a descent event, a landing event, or any combination thereof.

BRIEF DESCRIPTION OF THE DRAWINGS

The novel features of the technology are set forth with particularity in the appended claims. A better understanding of the features and advantages of the present technology will be obtained by reference to the following detailed description that sets forth illustrative embodiments, in which the principles of the technology are utilized, and the accompanying drawings (also "Figure" and "FIG." herein).

DETAILED DESCRIPTION

Figure 1:
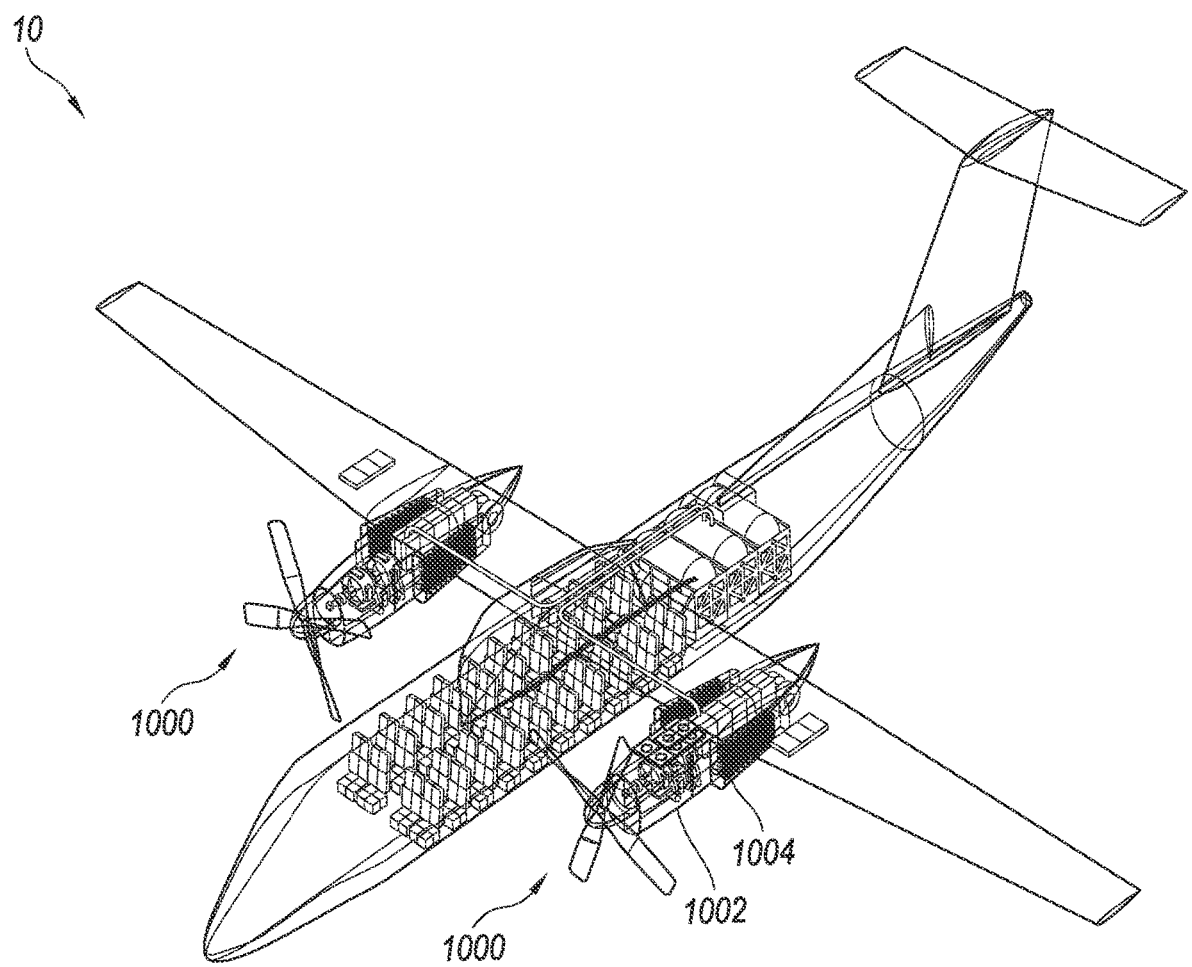
FIG. 1 schematically illustrates an aircraft with a hydrogen-powered hybrid electric powertrain in accordance with some embodiments of the present technology.

While various embodiments of the technology have been shown and described herein, it will be obvious to those skilled in the art that such embodiments are provided by way of example only. Numerous variations, changes, and substitutions may occur to those skilled in the art without departing from the invention in accordance with the technology. It should be understood that various alternatives to the embodiments of the technology described herein may be employed.

Method for Optimizing Operation of an Aerial Vehicle Having a Hydrogen-Powered Hybrid Electric Powertrain One aspect provided herein is a method for optimizing operation of an aerial vehicle having a hydrogen-powered hybrid electric powertrain. The method comprises predicting one or more changes or demands in an electrical power output of one or more fuel cell stacks located on the aerial vehicle; and controlling an optimal amount of air mass flow rate at an inlet to the one or more fuel cell stacks based at least in part on the one or more predicted changes or demands to the electrical power output, thereby reducing a transient period or lag time for delivery of the electrical power output by the powertrain.

Hydrogen-Powered Hybrid Electric Powertrain

Aspects of the present technology provide a hydrogen-powered powertrain and thermal management system for an aerial vehicle or other vehicle. The system employs an interior fuel source, such as hydrogen fuel, to generate energy and propulsive power, and to enable operation of supporting or peripheral systems within the aerial vehicles. The hydrogen-powered powertrain system includes a powertrain that converts the hydrogen fuel to electricity. Such energy conversion components comprise fuel cell stacks comprising a plurality of hydrogen fuel cells, which convert the hydrogen fuel to electricity. A primary electrical propulsion unit, such as a brushless permanent magnet motor, converts electricity from the primary electrical propulsion unit to mechanical power. The primary electrical propulsion unit is connected to a mechanical speed reducer and a propeller. The system also has a first compressor to condition ambient air, a peripheral electric power unit to provide power for the first compressor, a second compressor to further condition ambient air, a turbine to provide power to the second compressor, pumps which transmit cooling fluid to one or more radiators, one or more radiators which remove heat from the system, and batteries which store electrical energy to power the peripheral electric power unit or other electrical components of the aerial vehicle. The batteries, however, do not power the electric motor or other primary electrical propulsion unit. To provide stable and safe operation of such a powertrain, the condition, input, and output of each component is regulated to ensure efficient and safe energy transfer and storage, and heat and/or fluid distribution and rejection. As such, provided herein is a hydro-electro-aero-thermal management system (HEATMS) coupled to the powertrain and configured to control the powertrain at least in part by adjusting and optimizing the operational parameters of each component therein to enable safe and continuous operation.

Figure 2:
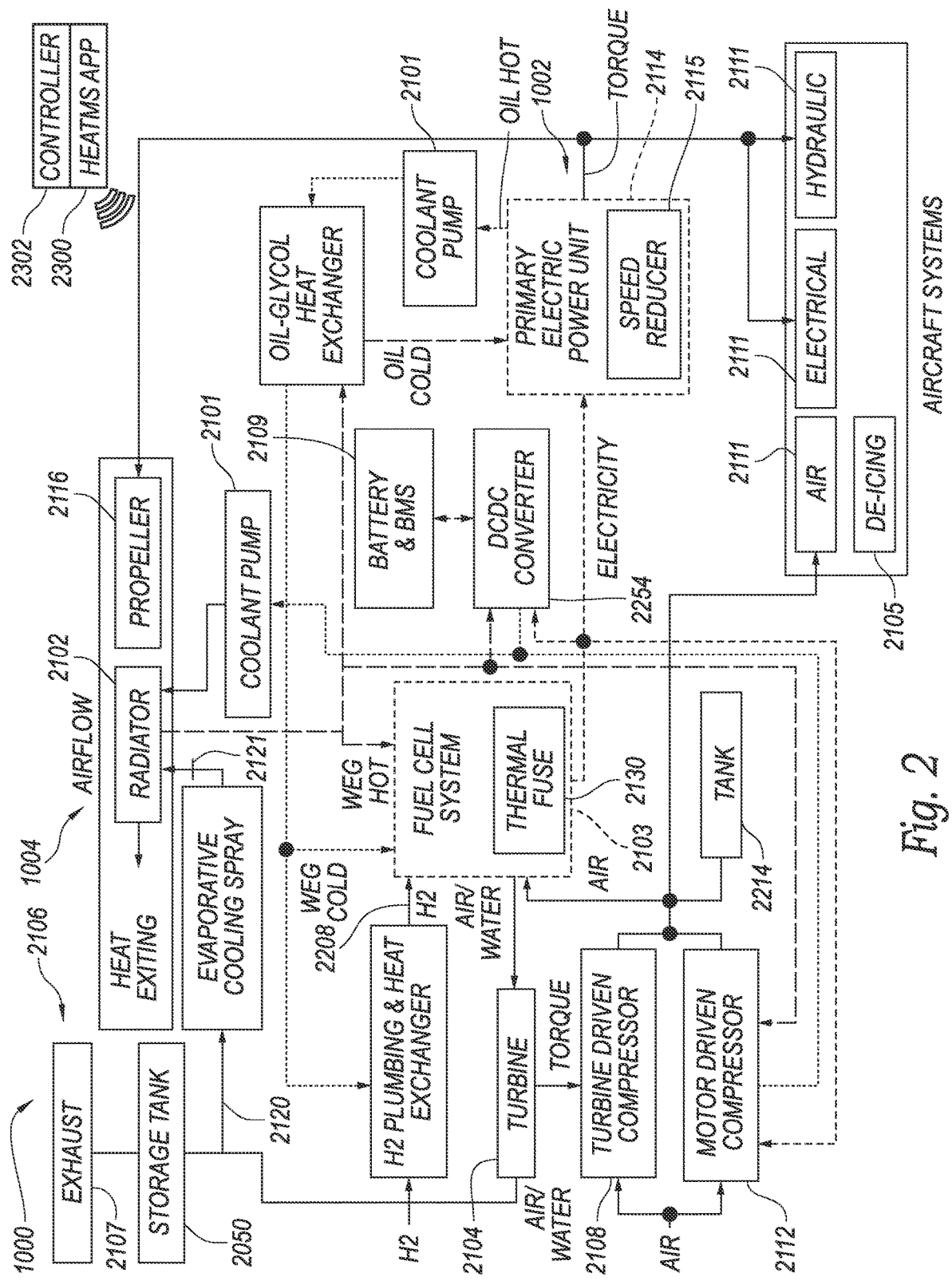
FIG. 2 shows a first schematic of an exemplary hydrogen-powered hybrid electric powertrain and its associated hydro-electro-aero-thermal management system (HEATMS), in accordance with some embodiments.

FIG. 1 is a schematic illustration of an aircraft 10 with one or more thermally managed powertrain systems 1000 comprising a hydrogen-powered hybrid electric powertrain 1002 and an associated hydro-electro-aero-thermal management system (HEATMS) 1004 in accordance with embodiments of the present technology. In the illustrated embodiment the aircraft 10 has two thermally managed powertrain systems 1000, although other aircraft or other vehicles can include one or more than two thermally managed powertrain systems in accordance with the present technology. As seen in FIG. 2, the powertrain system 1000 of the illustrated embodiment comprises one or more radiators 2102, pumps 2101, a water distribution system 2120, fuel cell stacks 2103, a primary electric power unit 2114, a speed reducer 2115, a battery 2109, a peripheral electric power unit 2110, peripheral aircraft components 2111, a turbine 2104, a second compressor 2108, a first compressor 2112, a propeller 2116, a fluid inlet 2113, a deicing system (2105), and a fluid exhaust 2107.

The illustrated powertrain 1002 can comprise the fuel cell stacks 2103, the primary electric power unit 2114 (e.g. an electric, brushless motor), the speed reducer 2115, the propeller 2116, the peripheral electric power unit 2110, and the battery 2109. The HEATMS 1004 works with the powertrain 1002 to help with heat management and control during operation of the powertrain 1002 and other components of the aircraft 10 (FIG. 1). The HEATMS 1004 can comprise the one or more radiators 2102, pumps 2101, the water distribution system 2120, the first compressor 2112, the second compressor 2108, the turbine 2104, and the fluid exhaust 2107. It is to be understood that the thermally managed powertrain system 1000 of other embodiments can include other components, and some of the components of the powertrain 1002 may be used in connection with the thermal management of the system. Also, the components of the HEATMS 1004 may be used in or with the powertrain 1002 for power generation for the aircraft 10 (FIG. 1 or other vehicle). The HEATMS 1004 is coupled to one or more controllers that communicate with and/or at least partially control components of the HEATMS 1004, the powertrain 1002, or both.

In some embodiments, the pumps 2101 transmit cooling fluid through or past other heat-generating components of the system and to the one or more radiators 2102. Accordingly, the cooling fluid acts to carry heat away from the components in the system 1000 to the radiators 2102 for efficient thermal dissipation of the heat. For example, the fuel cell stacks 2103 transmit thermal energy to the one or more radiators 2102. In one embodiment, the fuel cell stacks 2103 are connected to a closed cooling loop containing a water-ethylene glycol coolant or other coolant that flows to and/or through the radiator. The primary electric power unit 2114 transmits thermal energy to the one or more radiators 2102. In one embodiment, the primary electric power unit 2114 is connected to another closed cooling loop containing oil or other coolant that flows to and/or through the radiator. In some embodiments the fuel cell stack 2103 and the primary electrical power unit 2114 can be connected to separate cooling circuits or can be connected to the same cooling circuit.

As seen in FIG. 2, the primary electric power unit 2114 receives electrical power from the fuel cell stacks 2103. The speed reducer 2115 transmits thermal energy to the one or more radiators 2102. The speed reducer 2115 receives mechanical power from the primary electric power unit 2114. The speed reducer 2115 comprises a gearbox, a timing belt, an electromagnetic propeller clutch, or any combination thereof. A quantity of mechanical power transmitted from the primary electric power unit 2114 to the speed reducer 2115 is determined by the HEATMS 1004.

The peripheral electric power unit 2110 transmits thermal energy to the one or more radiators 2102. The battery 2109 receives electrical power from the fuel cell stack 2103 and transmits the electrical power to the peripheral electric power unit 2110. The battery 2109 can enable faster response of electrical components of the system 1000 based on the conditions of the aircraft and/or pilot control. The battery 2109 does not provide power to the primary electric power unit 2114, so the battery 2109 can be relatively small, lightweight, and configured to provide sufficient power to the peripheral electrical power unit 2110 in operation. A quantity of electrical power transmitted from the battery 2109 to the peripheral electric power unit 2110 is determined by the HEATMS 1004. In some embodiments the battery 2019 is a rechargeable, lithium-based battery that can generate in the range of approximately 10-30 kWh and weighs approximately 50 kg.

The turbine 2104 receives fluid, such as heated air and exhaust water, from the fuel cell stack 2103. In some embodiments, the second compressor 2108 is a turbine-driven compressor that receives mechanical power from the turbine 2104. The first compressor 2112 transmits a fluid, such as air, to the second compressor 2108. The first compressor 2112 of the illustrated embodiment is a motor driven compressor that receives mechanical power from the peripheral electric power unit 2110. A quantity of mechanical power transmitted from the peripheral electric power unit 2110 to the first compressor 2112 is determined by the HEATMS 1004. The propeller 2116 receives mechanical power from the speed reducer 2115. A quantity of thermal energy received by the one or more radiators 2102 is determined and managed by the HEATMS 1004. A flow rate of thermal energy received by the one or more radiators 2102 is also determined and managed by the HEATMS 1004.

In some embodiments, the first compressor 2112 receives air or other fluid from an inlet 2113. In some embodiments, the peripheral electric power unit 2110 provides mechanical power to one or more peripheral aircraft components 2111. The system 1000 further comprises an exhaust fluid subsystem 2106 receiving a fluid, such as the heated exhaust water flowing from the fuel cell stack 2103 and through the turbine 2104. The fluid subsystem 2106 can be coupled to the HEATMS 1004 and can be used to selectively transmit the exhaust water or other fluid to the radiator 2102 and/or to an exhaust 2107. The system 1000 further comprises a deicing system 2105 receiving a fluid, such as heated air and/or water, from the turbine 2104. The deicing system 2105 can selectively transmit the fluid to the exhaust 2107. The HEATMS 1004 is configured to control and determine the quantity of fluid received, transmitted, or both by the fluid subsystem 2106, the quantity and timing of fluid received, transmitted, or both by the deicing system 2105, and the quantity of fluid released by the exhaust 2107. In some embodiments, the turbine 2104 further transmits a fluid to an exhaust 2107 of the fluid subsystem 2106. In the illustrated embodiment, the fluid is heated water and/or air. In other embodiments, the fluid can be water, air, a coolant, an oil, or any combination thereof.

In some embodiments, the primary electric power unit 2114 can be an electric motor of the type described in U.S. patent application Ser. No. 17/318,993, titled Systems and Methods for Storing, Transporting, and Using Hydrogen, filed May 12, 2021, which is incorporated herein in its entirety by reference thereto. The primary electric power unit 2114 has a peak power of greater than about 800 kW, 900 kW, 1,000 kW, 1,100 kW, 1,200 kW, 1,300 kW, 1,400 kW, 1,500 kW, 1,600 kW, 1,700 kW 1,800 kW, 1,900 kW, 2,000 kW, 2,500 kW, or 3,000 kW. In some embodiments the primary electric power unit 2114 is a brushless, permanent magnet motor that has a power range of approximately 500 kW-1,600 kW. In some embodiments, the peripheral power unit 2110 has a peak power of greater than about 100 kW, 150 kW, 200 kW, 250 kW, 300 kW, 350 kW, 400 kW, 500 kW, 600 kW, 700 kW, or 800 kW. In some embodiments, the fuel cell stack 2103 has a specific power of greater than about 1 kW/kg, 1.5 kW/kg, 2 kW/kg, 2.5 kW/kg, 3 kW/kg, 3.5 kW/kg, 4 kW/kg, 4.5 kW/kg, 5 kW/kg, 5.5 kW/kg, or 6 kW/kg. In some embodiments, the system 1000 rejects at least about 1,000 kW, 1,250 kW, 1,500 kW, 1,750 kW, 2,000 kW, 2,500 kW, 3,000 kW, or 4,000 kW thermal power from the fuel cell. In some embodiments, the system 1000 rejects at least about 100 kW, 150 kW, 200 kW, 250 kW, 300 kW, 350 kW, 400 kW, 450 kW, 500 kW, 550 kW, or 600 kW thermal power from the electric power unit. In the illustrated embodiment, the aircraft 10 is a hydrogen-powered, dual motor regional aircraft with a power train 1002 that provides at least 2 MW of gross power output (i.e., 1 MW gross power output per electric motor).

In some embodiments, the turbine 2104 receives power from the fuel cell stack 2103. The first compressor 2112 receives power from the peripheral power unit 2110. The peripheral power unit 2110 receives power from the fuel cell stack 2103 and transmits power to peripheral aircraft components 2111 and the first compressor 2112. The fuel cell stack 2103, the primary electric power unit 2114, the rotational speed reducer 2115, and the peripheral power unit 2110 are in fluidic communication with the one or more radiators 2102. The fluidic communication can comprise a transfer of water, coolant, oil, or any combination thereof. In some embodiments, the power transmitted by the peripheral power unit 2110, the rotational speed reducer 2115, the turbine 2104, the first compressor 2112, the second compressor 2108, or any combination thereof, at least in part is in the form of thermal power, mechanical power, and/or electrical power. The power received by the peripheral power unit 2110 can provide power to a peripheral aircraft component 2111. The power can be transferred within the thermally managed powertrain system 1000 through fluid conduits, rotational shaft couplings, linear couplings, or any combination thereof.

Referring again to FIG. 2, operation of the system 1000 of an aircraft in at least one embodiment includes providing hydrogen fuel in either gaseous or liquid phase to multiple hydrogen fuel cells in the fuel cell stack 2103. In the illustrated embodiment, each primary electric power unit 2114 (e.g., the electric, brushless motor) is operatively coupled to multiple fuel cell stacks 2103 so as to receive adequate electrical power for operation of the motor and other aircraft systems. Each fuel cell stack 2103 processes the hydrogen fuel and generates electrical power that is provided to the motor or other primary electric power unit 2114.

Upon processing the hydrogen fuel, the reaction in the fuel cell stack 2103 generates exhaust water as well as heat. For example, in at least one embodiment, the fuel cell stacks 2103 generate approximately 9 kg of pure exhaust water for every 1 kg of hydrogen processed in the fuel cells. The exhaust water is typically atomized and at elevated temperatures, such as in the range of 65° C. and 85° C., which is generally close to the water's boiling temperature at approximately the aircraft's cruise altitude. The exhaust water can be directed through the turbine 2104 and then through fluid lines of the fluid subsystem 2106 to the water distribution system 2120, which includes one or more spray bars 2121 that can have atomizing nozzles in front of or otherwise adjacent to the radiator 2102. The exhaust water is sprayed through the atomizing nozzles onto the surface of the radiator 2102 where the exhaust water evaporates, so as to provide evaporative cooling at the radiator 2102. In addition to the evaporative cooling using the heated exhaust water, the radiator 2102 also receives a flow of coolant, such as water-ethylene glycol, oil, or other coolant, flowing in a closed coolant circuit system. As indicated above, a plurality of closed coolant circuits are used to carry heat generated in the powertrain system 1000 to the one or more radiators 2102 for thermal dissipation.

In some embodiments, over about 2.5 hours of use, the fuel cell stack 2103 outputs approximately 1,800 kg of a pressurized and supersaturated air and exhaust water mixture, which provides about 160 kWh of energy to the second compressor 2108. The fluid subsystem 2106 that receives the heated exhaust water from the fuel cell stack 2103 and turbine 2014 includes valving coupled to the HEATMS 1004 to control the fluid flow in the water lines. Accordingly, when conditions are such that the exhaust water should not be sprayed onto the radiator 2102, the exhaust water can be directed to a fluid storage tank 2050 of the fluid subsystem 2106 for temporary storage of the water. In some embodiments, a portion of the heat energy generated by the fuel cell stack 2103 is shed via the coolant (e.g., water-ethylene glycol or the like) that is circulated through a radiator 2102.

In some embodiments, the fuel cell stacks 2103 generate about 1,780 kW of heat energy and the electric power unit 2114 generates about 250 kW of heat energy. The combined heat energy shed via about 2000 L of the coolant that is circulated by 15 kW pumps 2101 through the radiator 2102. In some embodiments, the system 1000 further comprises a hydrogen piping, a water piping of the fluid subsystem 2106, a water weep hole, the water storage tank 2050, a humidifier, a radiator, or any combination thereof. In some embodiments, the hydrogen piping, the water piping, the water weep hole, the water storage, the humidifier, the radiator, or any combination thereof transmit heat, coolant, water, or any combination thereof to the pump. In some embodiments, per FIG. 2, the hydrogen piping, the water piping, the water weep hole, the water storage, the humidifier, the radiator, the purification system, or any combination thereof receive heat, coolant, water, or any combination thereof from the pump 2101. In some embodiments, the peripheral aircraft components 2111 receive electrical power from the peripheral electric power unit 2110. The peripheral aircraft components 2111 can comprise, as an example, a de-icing system, a hydraulic pump, an avionics system, a galley, an air conditioning system, or any combination thereof.

Figure 3:
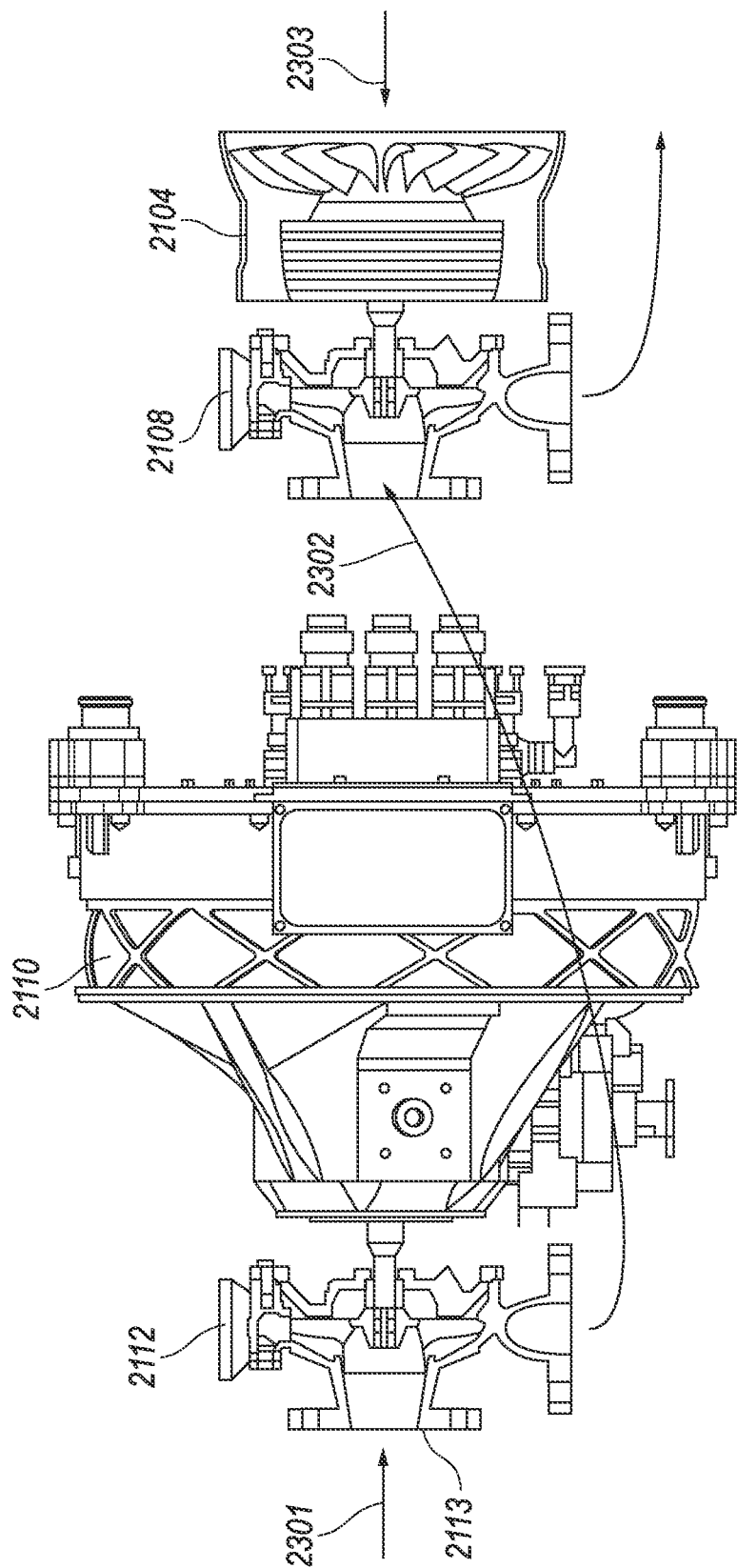
FIG. 3 shows an image of an exemplary fuel cell outlet turbine, in accordance with some embodiments.

Referring now to FIG. 3, when the first compressor 2112 is operating, such as during startup or while the aircraft is moving, the first compressor receives airflow through the air inlet 2113 and compresses the air. The first compressor 2112 provides the flow of compressed air to the second compressor 2108, which receives power from the turbine 2104 and/or the fuel cell stack 2103. In some embodiments, the first compressor 2112, the second compressor 2108, or both comprise a turbocharger. The first compressor 2112, the second compressor 2108, or both comprise an electric compressor, a mechanical compressor, or both. The first compressor 2112, the second compressor 2108, or both have a mass flow at an altitude of about 10,000 feet in the range of about 1,500 g/s to about 5,000 g/s.

The first and second compressors 2112 and 2108 drive airflow to the fuel cell stacks 2103 for processing with the fuel to generate the electricity. Further, the first and second compressors 2112 and 2108 are actively controlled and are configured to effectively preload and drive or temporarily overdrive the associated fuel cell stack 2103 by driving higher air mass flow rates to the fuel cell stack 2103 at selected times, thereby ensuring very fast transients or responses in real time to power needs for immediate conditions or configurations. In some embodiments, the hydrogen fuel system providing the hydrogen to the fuel cell stack 2103 can include a recirculating flow of pressurized hydrogen for instant availability of the hydrogen, such as when the first and second compressors 2112 and 2108 drive excess air to the fuel cell stack for additional power output capacity.

The second compressor 2108 of the illustrated embodiment is coupled to a supplemental storage container, such as one or more pressurized tanks 2214, that retain a selected volume of compressed air or other working fluid. In some embodiments, the pressurized tank 2214 is configured to hold approximately 4 kg of air at a pressure of about 2 bar at sea level. Other embodiments can use larger or smaller tanks with different volumes and/or pressures. The pressurized tank 2214 is coupled to the fuel cells stack 2103 and is configured to provide an on-demand flow of air to the fuel cell stack 2103. For example, upon startup of the electric motors 2114 and the fuel cell stacks 2103, the compressed air from the tank 2214 is provided to the fuel cells in the fuel cell stack 2103 for instant airflow access while the first and second air compressors 2112 and 2108 are being activated. The compressed air from the tank 2214 can also be provided to the fuel cell stack 2103 during other conditions for which instant air access may be needed or desired.

As indicated above, the fuel cell stack 2103 is configured to provide electricity to the system's small battery 2109, which is coupled to the peripheral electrical power units 2110, but not to the electric motor 2114. Accordingly, the small battery 2109 provides a temporary power source to the aircraft's peripheral components for a short time to provide the required initial levels of electrical power while the fuel cell stack 2103 is being activated. For example, during motor and system startup, the small battery 2019 can be used to initially power selected aircraft components or systems, and the compressed air from the one or more pressurized tanks 2214 can be used for instant access to air flow to the fuel cell stack 2103. When the fuel cell stack 2103 is operating, it also provides electricity to the peripheral electrical power unit 2110, which is coupled to and powers the first compressor 2112. Once the fuel cell stack 2103 and the first and second compressors 2112 and 2108 are activated and operating, the one or more tanks 2214 can be refilled and/or repressurized, and the small battery 2109 can be recharged for subsequent use. In some embodiments, the peripheral electrical power unit 2110 can be integrated with the first compressor 2112.

In some embodiments, each fuel cell stack 2103 is provided with a thermal trigger or fuse 2130 to shut down the associated fuel cell stack upon reaching a thermal threshold. This configuration can avoid overheating and thermal runaway of the hydrogen-powered fuel cell stack 2103. In the illustrated embodiment, the thermal fuse 2130 can be a passive, fail-safe thermal fuse, such that the flow of hydrogen gas to the fuel cell stack 2103 is terminated upon the fuel cell stack reaching a threshold temperature. In other embodiments, the input and/or output temperatures of the fuel cell stack 2103 are monitored so as to activate the thermal fuse 2130 and automatically shut down the fuel cell stack 2103 upon reaching the threshold temperature. Other embodiments can utilize other control systems for safe operation of the hydrogen-powered fuel cell stacks 2103 and associated electric motors or other power plants.

The architecture of the compressor-driven fuel cell stacks of the present technology provides a configuration in which the fuel cell stacks 2103 are the main power source to the primary electric power unit 2114 and associated components of the powertrain 1002 without requiring an intermediate battery. The first and second compressors 2112 and 2108 are controlled and activatable to pre-load the fuel cell stacks 2103 in anticipation of one or more predicted power needs. As a result, the configuration avoids the need for heavy batteries as well as the need for heavy DC-to-DC converters, which reduces the complexity, cost, and weight of the fuel cell stack system. For example, in one embodiment wherein the aircraft 10 (FIG. 1) is a dual-motor regional aircraft, the elimination of the conventional DC-to-DC converters is a weight savings of over approximately 800 kg. Further, the present technology is also configured to anticipate and predict power needs and the associated timing, and the system activates the first and/or second compressors 2112 and 2108 to preload the fuel cell stacks 2103 before and during those phases of flight where fast transients are required (approach & landing). Operation of the compressors 2112 and 2108 based on actual and predicted power needs is carefully controlled, so the compressors do not pre-load the fuel cell continuously or excessively, which would significantly decrease the efficiency of the fuel cell system. The architecture of the powertrain system 1000 is such that it eliminates the heavy primary batteries and DC-to-DC converters, and the system only utilizes the small peripheral battery 2109 to temporarily provide power to the fuel cell peripherals during startup of the fuel cell system. This small peripheral start up battery 2109 also only needs a small, light DC-to-DC converter to control the battery's charge/discharge rate and to match the voltage on the powertrain's high voltage bus.

As discussed in greater detail below, the second compressor 2108 is coupled to the HEATMS 1004 and can be controlled to provide airflow to the fuel cell stack 2103 at selected volumes and at selected times, depending upon the current or anticipated needs for power output to the electric power unit 2114. In the illustrated embodiment used with the dual motor aircraft 10, each electric motor is coupled to a plurality of fuel cell stacks 2103. For example, each electric motor is coupled to approximately ten to fourteen hydrogen-powered fuel cell stacks 2103. The second compressor 2108 is controlled so that when an electric motor 2114 requires more power, the second compressor 2108 can be controlled by the HEATMS 1004 to increase the airflow to the associated fuel cell stack 2103. The flow rate and volume of airflow from the second compressor 2108 to the fuel cell stack 2103 is actively controlled to balance the fuel cell efficiency, the hydrogen fuel usage, the power output, and the thermal management system so as to achieve the desired power output from the associated electric motor 2114 without overdriving and overheating the fuel cell stack 2103 for an excessive period of time.

Figure 4A:
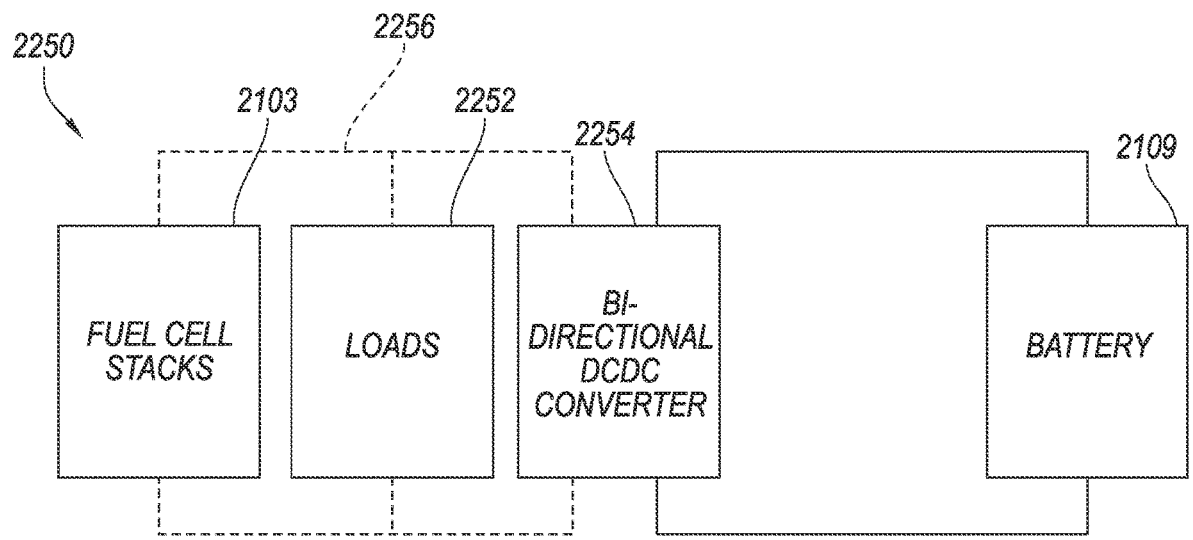
FIG. 4A is a schematic diagram of a fuel cell powertrain architecture in accordance with an embodiment of the present technology.

FIG. 4A is a schematic diagram of a fuel cell powertrain architecture 2250 in accordance with an embodiment of the present technology. In the illustrated embodiment, the fuel cell stacks 2103 and the powertrain loads 2252, such as the primary power electric unit 2114, the first compressor 2112, the small bi-directional DC-DC converter 2254, the coolant pumps 2101, etc. (FIG. 2), are connected directly to a main high voltage bus ("HV-bus") 2256. The voltage output provided from the fuel cell stacks 2103 to the primary electric power unit 2114 is not regulated by the DC-DC converter 2254. The small startup battery 2109 is coupled to the HV-bus 2256 by the DC-DC converter 2254. Accordingly, the voltage provided to and from the small startup battery 2109 to the HV-bus 2256 is regulated by the DC-DC converter 2254.

In the illustrated embodiment, the startup battery 2109 is used to temporarily power the powertrain loads 2252 at least until the fuel cell stacks have completed the startup process, as discussed below. The bidirectional DC-DC converter 2254 controls the battery charge and discharge rate by matching the HV-bus voltage. Once the fuel cell system has started and is generating power, the startup battery 2109 can be recharged. In the illustrated embodiment, the HV-bus 2256 is directly connected to the fuel cell stacks 2103 and to the loads 2252. The components corresponding to the loads 2252 are also directly connected to the HV-bus 2256 without a large intermediate DC-DC converter. These loads 2252 may have a maximum voltage rating less than the maximum voltage output from the fuel cell stacks 2103, such as during startup of the system. Accordingly, the voltage received from the fuel cell stacks 2103 is selectively controlled so as to not exceed the voltage that can be accepted by the components.

Figure 4B:
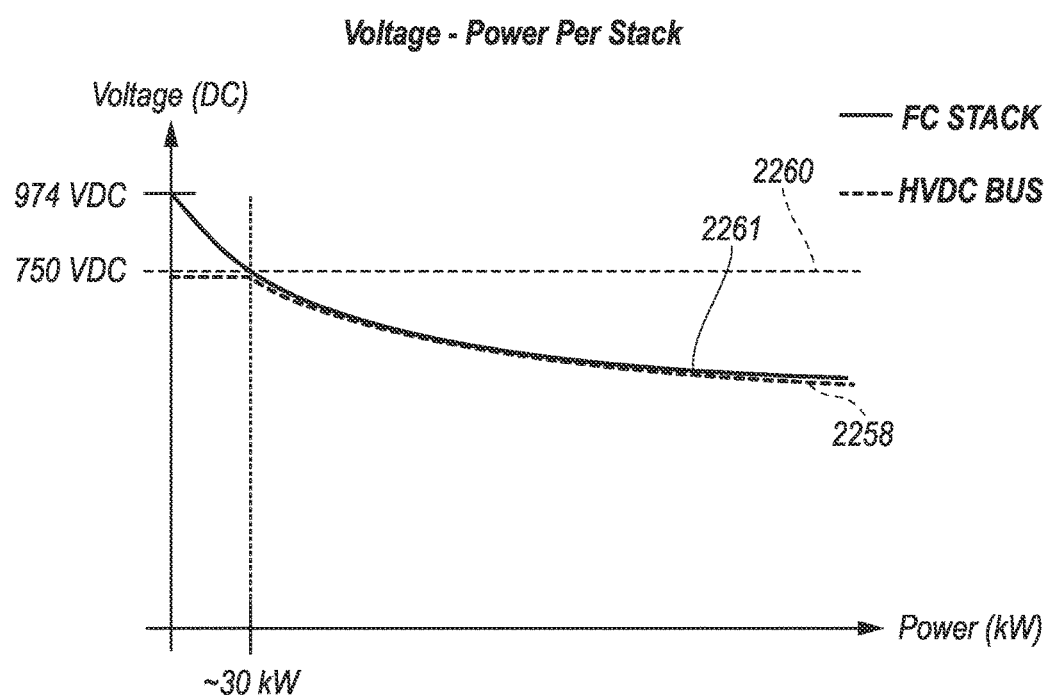
FIG. 4B is a voltage-power per stack graph of the fuel cell powertrain architecture of FIG. 4A.

FIG. 4B is a graph of the voltage-power per fuel cell stack of the fuel cell powertrain architecture 2250. The fuel cell stack voltage in response to the power being drawn from the components connected to the HV-bus 2256 is shown by the curve 2258. In some embodiments, the maximum voltage level that can be accepted by the loads 2252 connected to the HV-bus 2256, as shown as the dashed line 2260 in the graph, may be less than the maximum voltage output from the fuel cell stacks 2103, particularly at startup and before a sufficient amount of power is drawn from the HV-bus 2256 by the other loads 2252. For example, in the illustrated embodiment, the voltage on the HV-bus 2256 at startup, generated by the fuel cell stacks 2103 with approximately 0 kW draw on the bus from other loads 2252, is approximately 974 volts. The maximum voltage rating of the other loads 2252, however, is approximately 750 volts. When the other loads 2252 are activated and power is drawn from the HV-bus 2256 by the loads 2252, the voltage level decreases, such that the voltage is at or below 750 volts when the power draw is at or above 30 kW. Accordingly, the voltage to the HV-bus 2256 needs to be controlled, particularly at startup, at least until the power draw from the HV-bus 2256 drops to or below the maximum voltage level that can be accepted by the loads 2252 (e.g., approximately 750 volts). This is shown by the solid line 2261 in the curve representing the HV bus voltage, which does not exceed 750 volts in the illustrated embodiment. As a result, the loads 2252, such as the primary electric power unit 2214, the first compressor 2112, the pumps 2101, the small DC-DC converter 2254, etc. (FIG. 2) are protected from receiving excessive voltage during fuel cell stack startup.

Figure 4C:
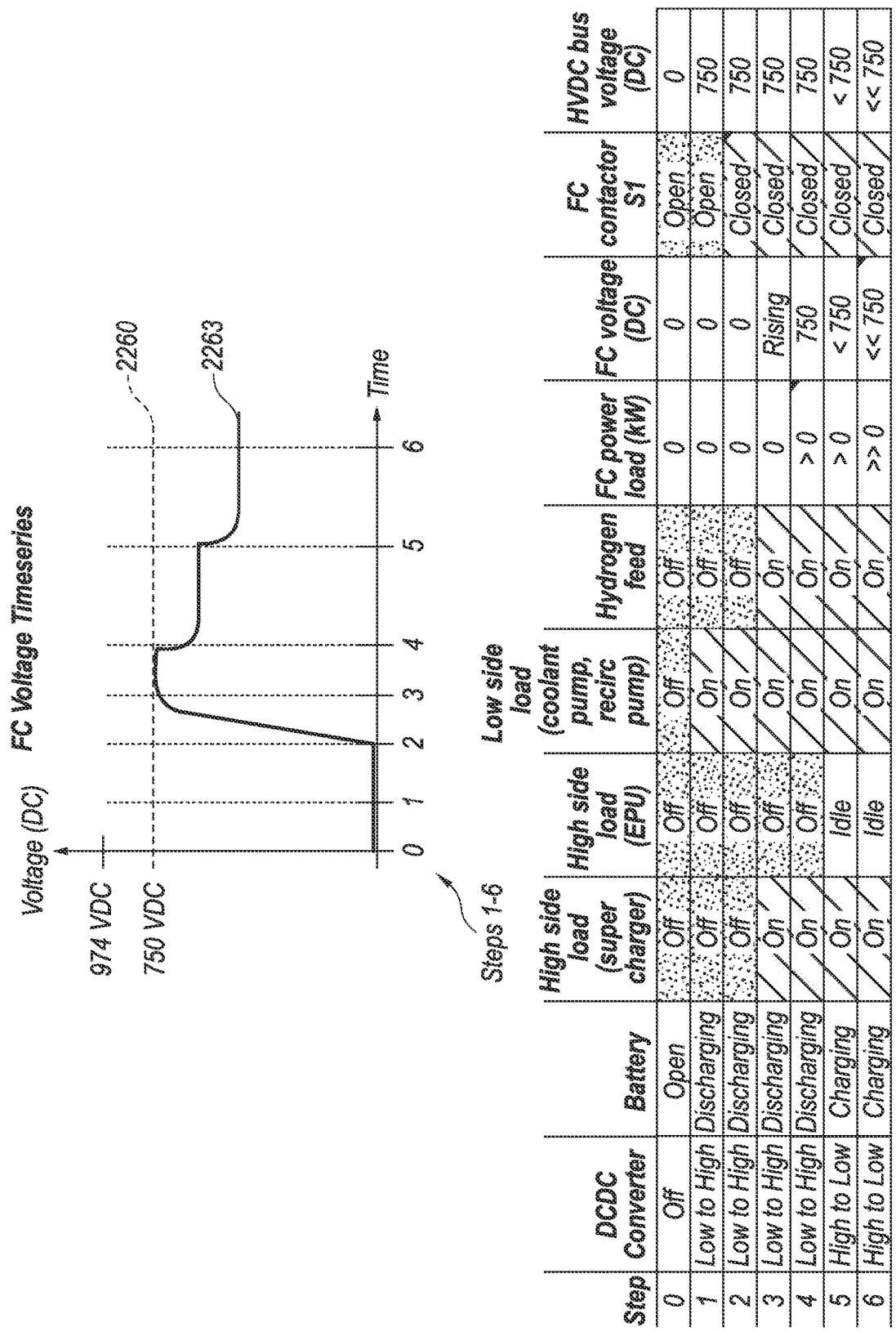
FIG. 4C is a voltage-time graph and sequence table of a startup sequence of at least one embodiment of the present technology.

The current technology provides a startup sequence that allows the fuel cell stack 2103 and the primary components connected to the HV-bus 2256 (i.e., the loads 2252) to power up without exceeding their respective maximum voltage rating. FIG. 4C is a voltage-time graph and sequence table of a startup sequence in accordance with at least one embodiment of the present technology. Steps 1-6 of the startup procedure are identified in FIG. 4C, and the corresponding voltage on the HV-bus 2256 is shown by the curve 2263. In this embodiment, at Step 1 of the startup, the fuel cell stacks 2103 are temporarily disconnected or isolated from the HV-bus 2256, hydrogen fuel is provided to the fuel cell stacks 2103, and the startup battery 2109 provides power to the HV-bus through the small DC-DC converter 2254, so as to power the pumps 2101 and the other loads 2252 on the HV-bus. At Steps 2-3, the startup battery 2109 provides power to the first air compressor 2112 and other loads 2252 on the HV-bus 2256. The fuel cell stacks 2103 of the illustrated embodiment are activated and begin generating electricity at a voltage that may exceed the voltage rating of some or all of the loads 2252 connected to the HV-bus 2256. At Step 2, when the loads 2252 draw down the voltage from the HV-bus 2256 to a sufficient level, the activated fuel cell stacks 2103 are connected to the HV-bus 2256, and the stack voltage on the bus rises to the maximum controlled stack voltage, which is still below the maximum rated voltage of the other loads 2252 on the bus. In the illustrated embodiment that maximum rated voltage is 750 volts, but the maximum rated voltage in other embodiments can be greater or less than 750 volts.

At Steps 3-6, the fuel cell stacks 2103 can provide the regulated, full power to the HV-bus 2256 at the selected voltage (e.g., 750 volts) to power to all of the loads 2252 on the bus. In addition, at Steps 5-6, the startup battery 2109 is no longer providing power, and the bi-directional DC-DC converter 2254 is switched so as to recharge the battery 2109 for use in the next startup sequence. The voltage on the HV-bus 2256 is closely monitored, and in the event the voltage on the bus exceeds a maximum voltage rating of a component on the bus, the voltage on the bus can be adjusted, the component may be disconnected from the bus, or the fuel cell stack may even be disconnected or the power output decreased as to properly maintain the electrical balance of the system for safe and consistent operation.

Figure 4D:
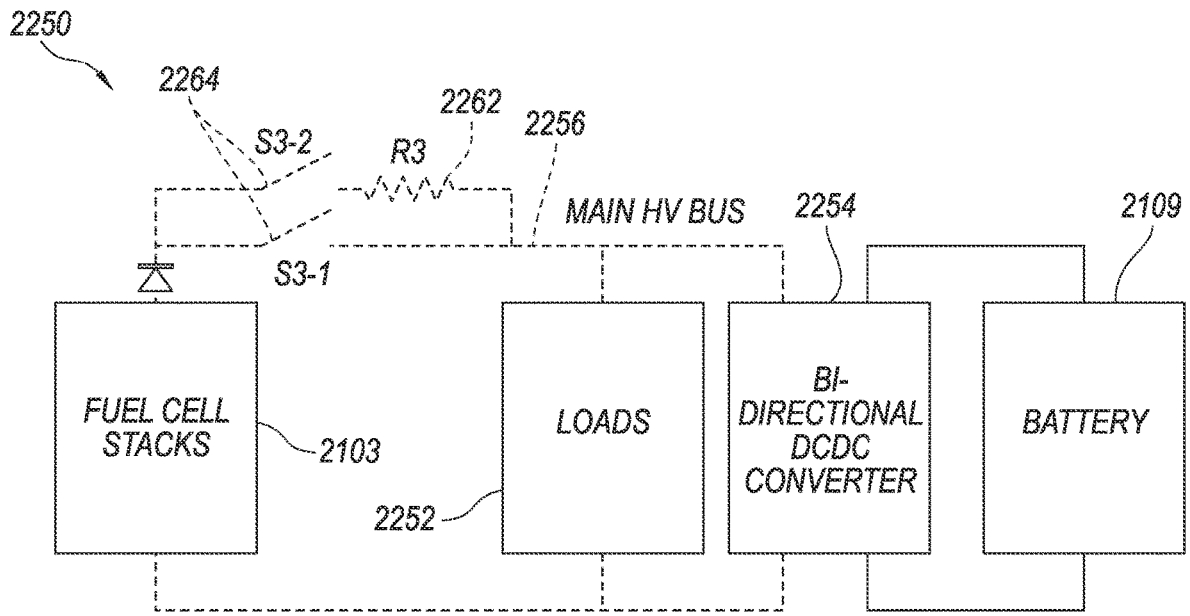
FIG. 4D is a schematic circuit diagram of a fuel cell powertrain architecture in accordance with at least one embodiment of the present technology.

In another embodiment, the fuel cell powertrain architecture can be configured to control the voltage on the HV-bus 2256. For example, the HV-bus 2256 can include one or more resistive loads in series or in parallel with the fuel cell stacks 2103, so that the resistive loads can be engaged or disengaged to help control the HV-bus's voltage levels. FIG. 4D is a schematic circuit diagram of a fuel cell powertrain architecture 2250 in accordance with at least one embodiment of the present technology. In this embodiment, the circuitry of the HV-bus 2256 has one or more resistors 2262 arranged in series with the fuel cell stacks 2103 and the loads 2252, so as to effectively provide a voltage divider between the fuel cell stacks 2103 and the other loads 2252, such as the primary electric power unit 2114, the air compressor 2112, the coolant pumps 2101, the DC-DC converter 2254, etc., that may have a lower acceptable voltage level than the maximum voltage output from the fuel cell stacks 2103. The HV-bus circuitry also includes switches 2264 that can be closed and opened to engage and disengage the resistors 2262 during operation of the bus. During the startup procedure when the fuel cell stacks 2103 are activated and the voltage provided to the HV-bus 2256 exceeds a selected level (e.g., over 750 volts), the switches 2264 are closed to engage the resistor 2262 and reduce the voltage on the bus. When the other loads 2252 draw enough voltage down from the HV-bus 2256, the switches 2264 can be opened to disengage the resistor 2262 in the HV-bus 2256. This disengagement of the resistor 2262 would occur at approximately Step 2 of the sequence discussed above in connection with FIG. 4C, and the remaining Steps 3-6 of the sequence would remain the same.

Figure 4E:
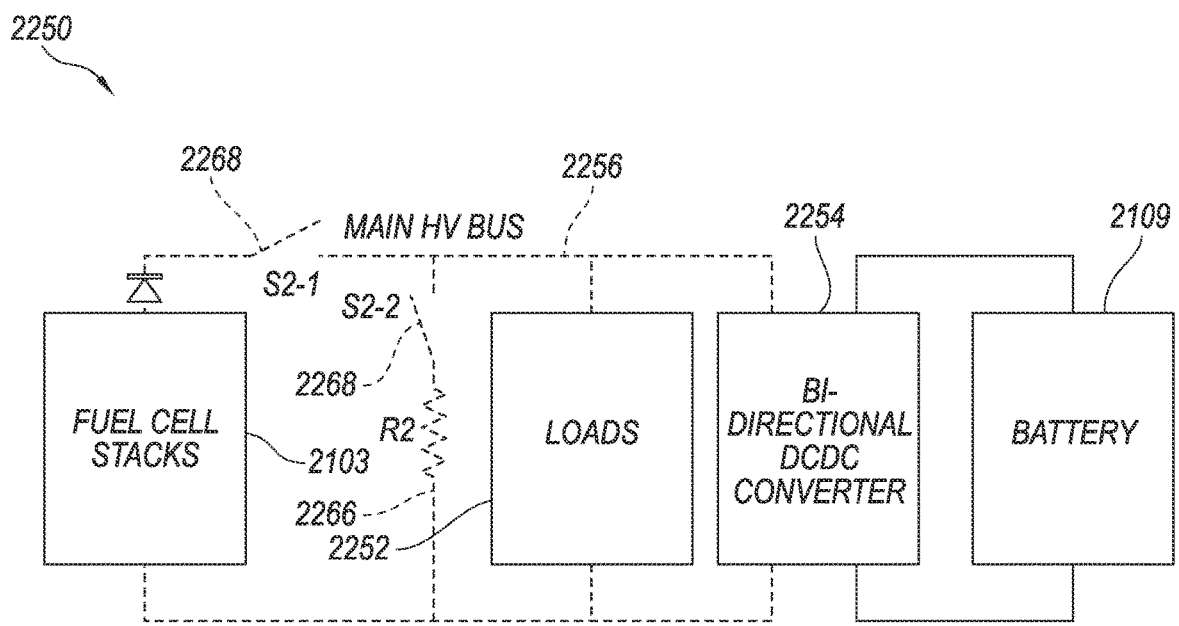
FIG. 4E is a schematic circuit diagram of a fuel cell powertrain architecture in accordance with another embodiment of the present technology.

FIG. 4E is a schematic circuit diagram of a fuel cell powertrain architecture 2250 in accordance with another embodiment of the present technology. In this embodiment, the HV-bus 2256 has one or more resistors 2266 arranged in parallel with the fuel cell stacks 2103 and the other loads 2252 on the bus. Switches 2268 are positioned to so as to engage and disengage the resistor 2266 upon closing or opening the switches. This parallel configuration can allow for use of one or more dedicated resistors 2262 to potentially reduce the complexity of the startup sequence. During the startup procedure, once the power draws from the other loads 2252 sufficiently draw down the voltage on the HV-bus 2256, the switches 2268 are opened to disengage the resistors 2262. This disengagement of the resistors 2262 would occur in Steps 2-3 of the startup sequence discussed above in connection with FIG. 4C, and the remaining Steps 3-6 of the sequence would remain the same.

The circuit diagrams of FIGS. 4D and 4E are examples of only two embodiments for controlling the voltage on the HV-bus 2256 during startup so as to avoid using large and heavy DC-DC converters to regulate the voltage output from the fuel cell stacks 2103 to the bus. Other embodiments can use other circuit configurations that manage the voltage to or on the HV-bus 2256 to which the other loads 2252 in the powertrain system can be connected.

Figure 5:
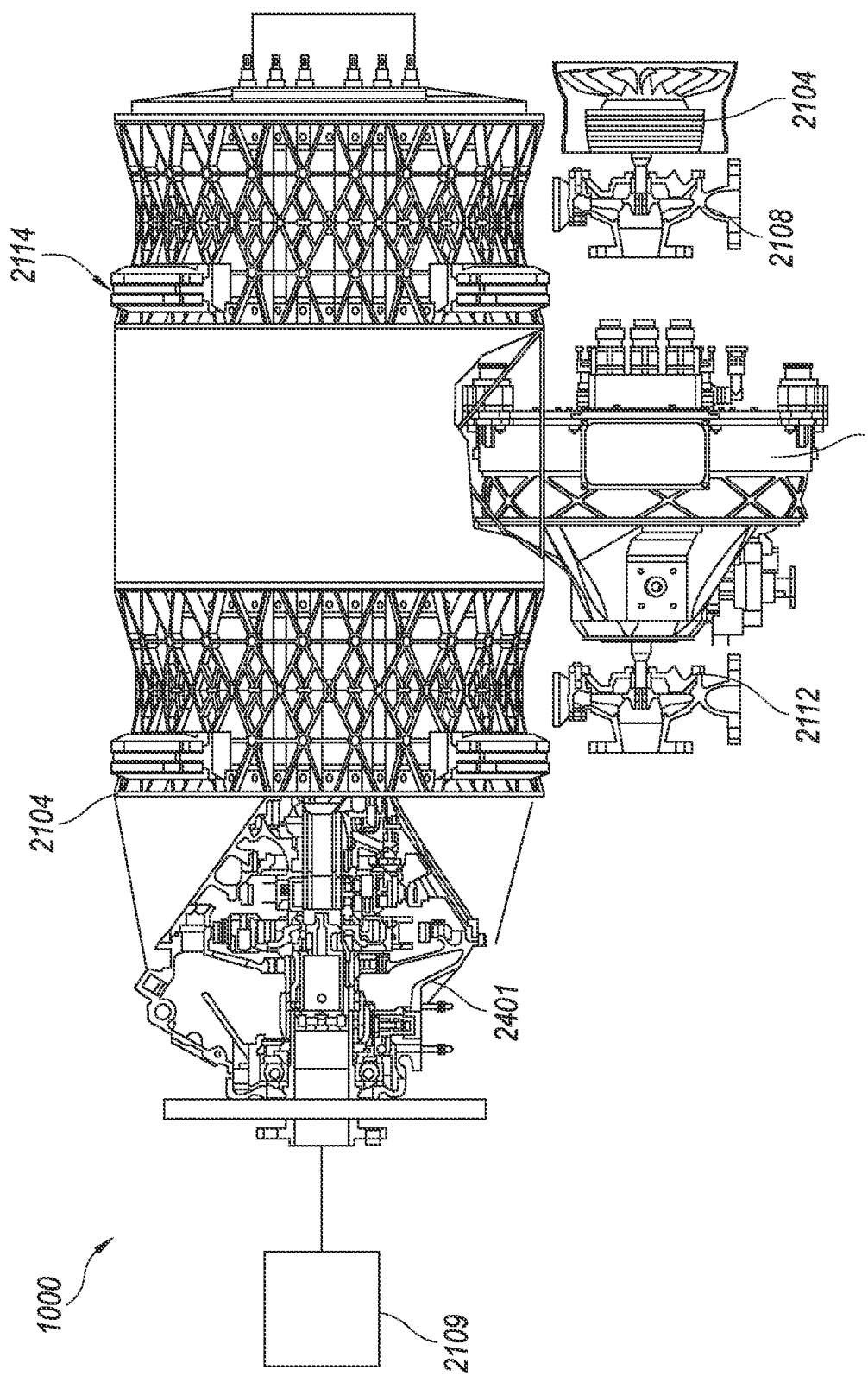
FIG. 5 shows an image of a first exemplary electric power unit and rotational speed reducer, in accordance with some embodiments.
Figure 6:
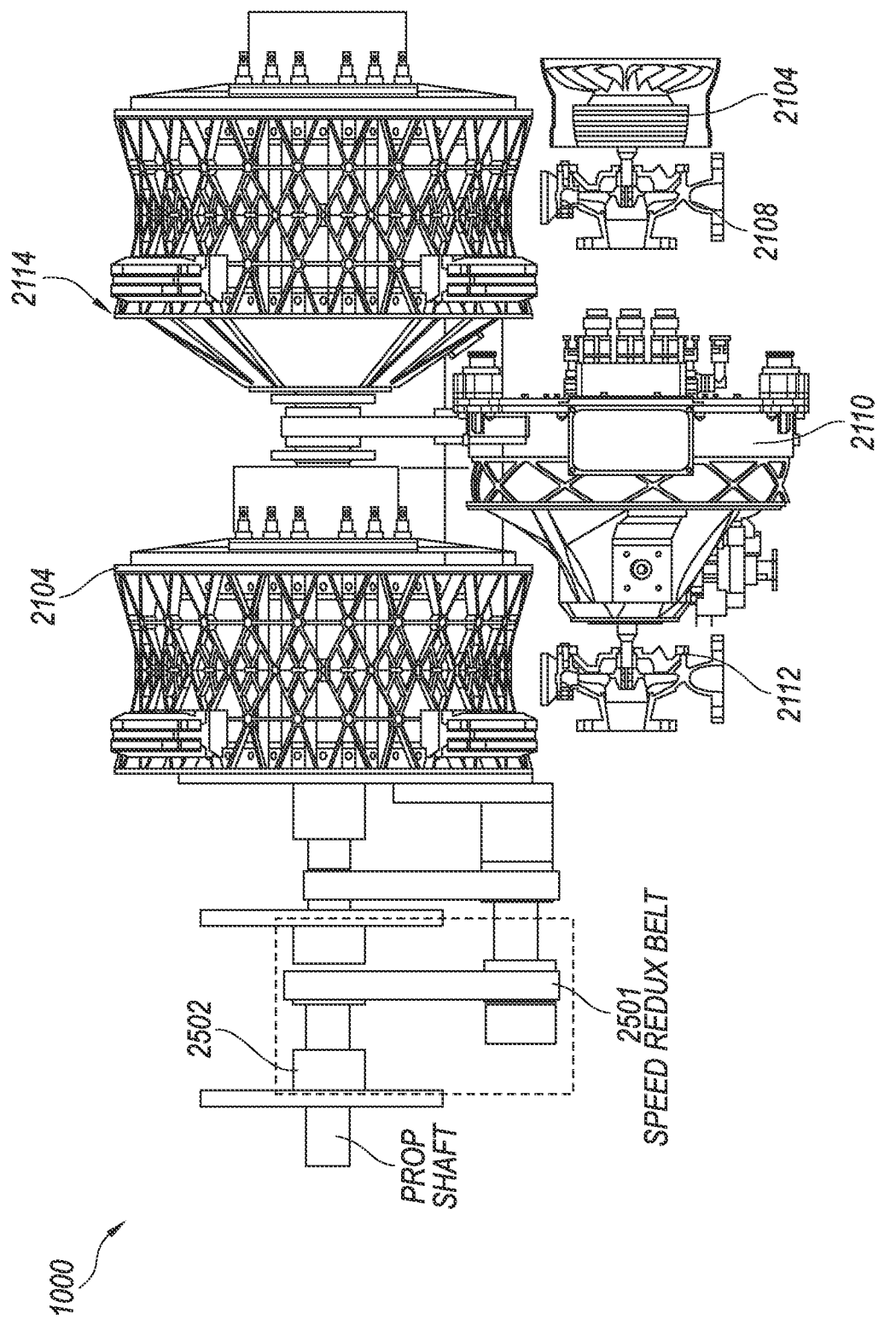
FIG. 6 shows an image of a second exemplary electric power unit and rotational speed reducer, in accordance with some embodiments.
Figure 7:
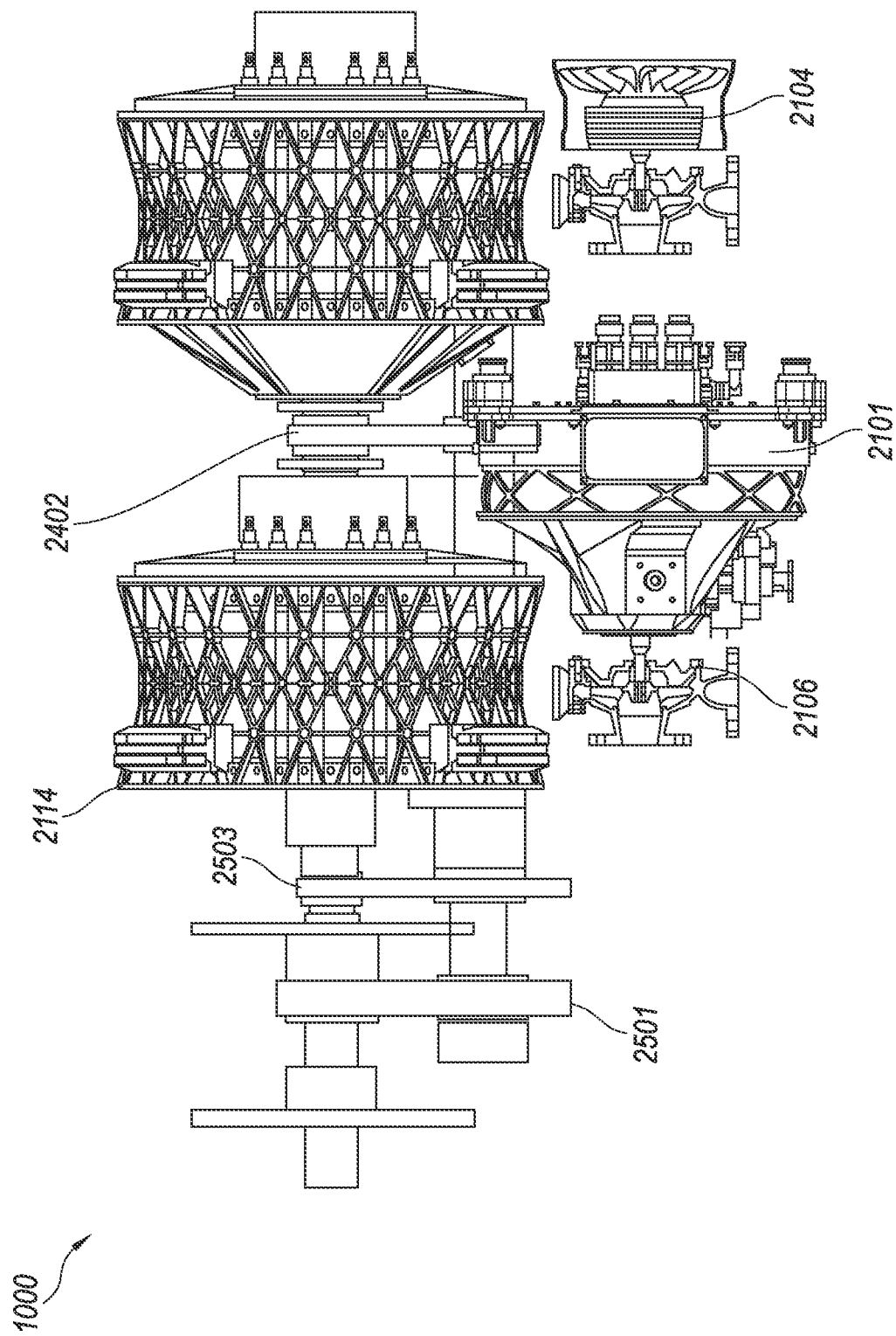
FIG. 7 shows an image of a third exemplary electric power unit and rotational speed reducer, in accordance with some embodiments.

FIGS. 5-7 show exemplary rotational speed reducers 2104 and primary electric power unit 2114. In some embodiments, the rotational speed reducer 2104 receives power from the primary electric power unit 2114 and transmits power to the propeller 2109. In some embodiments, the rotational speed reducer 2104 comprises a gearbox, a timing belt, an electromagnetic clutch, or any combination thereof.

In some embodiments, per FIG. 5, the rotational speed reducer 2104 is a planetary gearbox 2401. The use of the planetary gearbox 2401 reduces a weight and size of the hydrogen-powered hybrid electric powertrain. The use of the planetary gearbox 2401 can increase a stiffness of the hydrogen-powered hybrid electric powertrain and can provide a simplified gear reduction stage. The planetary gearbox 2401 comprises high-contact gears, an integrated brake, or both to mitigate propeller 2109 vaning in case of shutdown. The use of the planetary gearbox 2401 provides a lower gear reduction with less mechanical stress. In some embodiments, when the rotational speed reducer 2104 comprises the planetary gearbox 2401, an output shaft of the electronic power unit and the rotation of the propeller 2109 are permanently coupled.

In some embodiments, per FIG. 6, the rotational speed reducer 2104 comprises a timing belt 2501. The use of the timing belt 2501 can eliminate a requirement for cooling. The use of the timing belt can also reduce the complexity, cost, or both of the rotational speed reducer 2104. The use of the timing belt 2501 can reduce weight and stress as speed reduction and higher torques occur at propeller shaft 2502. In some embodiments, when the rotational speed reducer 2104 comprises the timing belt, an output shaft of the electronic power unit and the rotation of the propeller shaft 2502 are permanently coupled.

In some embodiments, per FIG. 7, the rotational speed reducer 2104 of the hydrogen powered hybrid-electric powertrain 1002 comprises a timing belt 2501 and an electromagnetic propeller clutch 2503. In some embodiments, when the rotational speed reducer 2104 comprises the timing belt 2501 and the electromagnetic propeller clutch 2503, an output shaft of the electronic power unit and the rotation of the propeller shaft 2502 are decouplable during use. In some embodiments, the configuration of the rotational speed reducer 2104 with the timing belt 2501 and the electromagnetic propeller clutch 2503 can eliminate or reduce the requirement for cooling. In some embodiments, this configuration can also provide reduced complexity, cost, or both. The configuration can also reduce weight and stress as speed reduction and higher torques occur at propeller shaft 2502. In some embodiments, this configuration can also absorb transient outputs from motors and enable decoupling of a failed motor from the drive shaft to eliminate or reduce parasitic drag, while maintaining net power near about 50%. In some embodiments, the powertrain 1002 does not comprise the rotational speed reducer 2104, wherein the primary electric power unit 2114 provides rotational energy at a sufficiently reduced speed.

In some embodiments, per FIG. 2, ambient and cabin air received by a the first compressor 2112 is compressed and provided to the second compressor 2108 and the aircraft's cabin air conditioning unit 2202. In some embodiments, the cabin air conditioning unit 2202 receives and/or transmits thermal energy to the radiator 2102. The air compressed by the first compressor 2112 is further compressed by the second compressor 2108, which further receives mechanical energy from the turbine 2104. The air compressed by the second compressor 2108 is transmitted through a humidifier and to a fuel cell stack 2103. The humidifier exchanges thermal energy and coolant with the radiator 2102 and provides coolant (e.g., water-ethylene glycol, or a combination thereof) to the coolant pump 2101 through the closed circuit piping, wherein the coolant flowing in the piping receives thermal energy from the coolant pump.

The fuel cell stack 2103 receives hydrogen from hydrogen piping 2208 and receives the coolant that is pumped via the coolant pump 2101 to carry the heat energy to the radiator 2102. The fuel cell stack 2103 provides electrical energy to the coolant pump 2101, the peripheral power unit 2110, and the primary electric power unit 2114. In some embodiments, the peripheral power unit 2110 exchanges oil or other coolant with the coolant pump 2101 and provides thermal energy to the one or more radiators 2102. The peripheral power unit 2110 can provide mechanical energy to the first compressor 2112 and to peripheral aircraft components 2111, such as hydraulic pumps, avionics, a deicing system, and a galley. In some embodiments, the electric power unit 2114 exchanges oil or other coolant in the associated coolant circuit with the coolant pump, provides thermal energy to the radiator 2102, and provides mechanical power to a gearbox 2212. The gearbox 2212 exchanges oil or other coolant with the coolant pump 2101, provides thermal energy to the coolant pump 2101, and provides mechanical power to a propeller 2116.

Computer Hydro-Electro-Aero-Thermal Management System (HEATMS)

Figure 8:
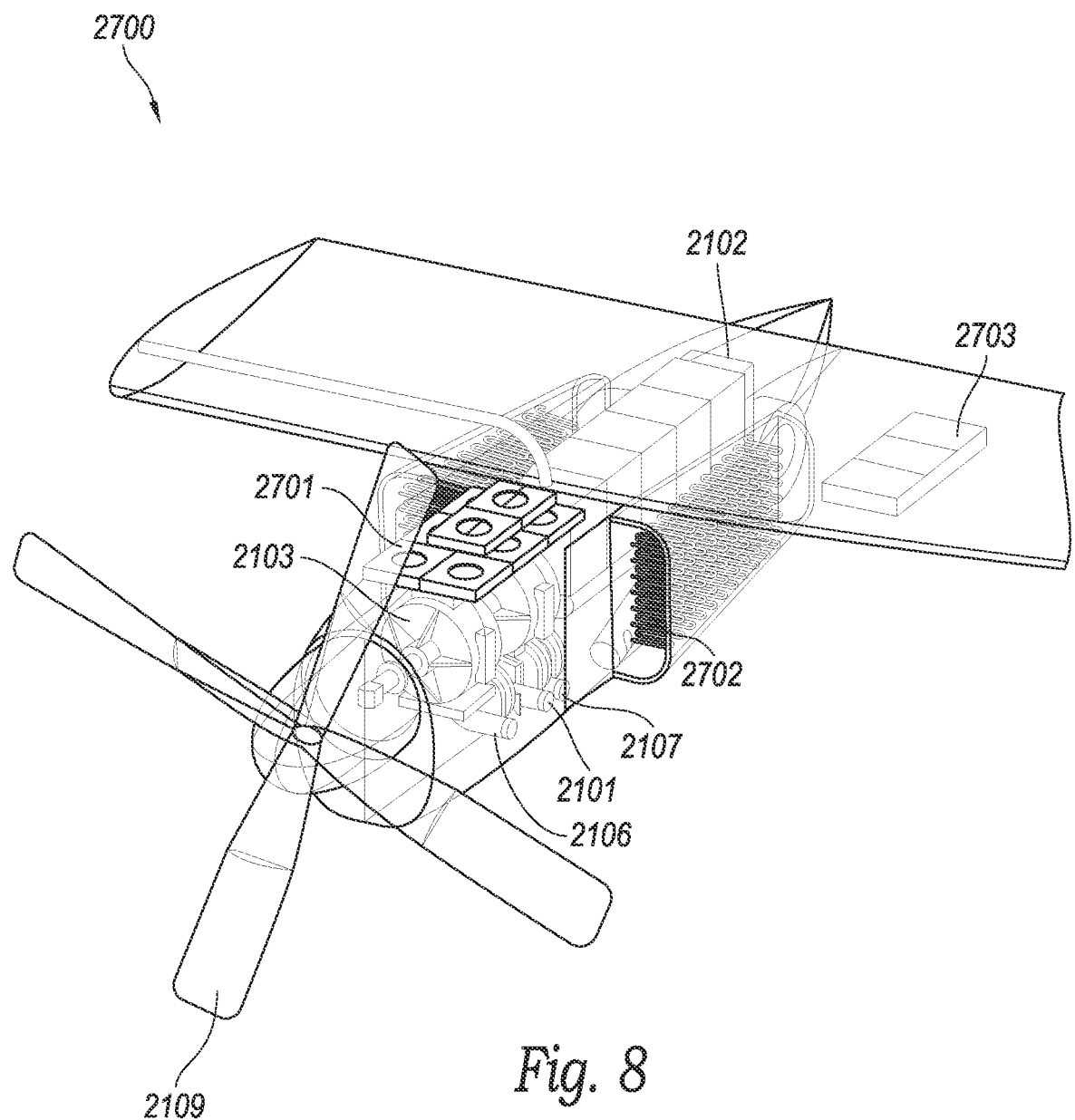
FIG. 8 shows an image of an aircraft comprising the exemplary hydrogen-powered hybrid electric powertrain and its associated hydro-electro-aero-thermal management system (HEATMS), in accordance with some embodiments.

During use of the aircraft 10 (FIG. 1) with its powertrain system 1000, the system components typically require different amounts of accessible power during different stages of use. For example, the aircraft's components typically need different levels of available power during startup, taxi, takeoff, climb, cruise, intra-flight maneuvers or modifications, descent, landing, and shutdown. Embodiments of the present technology are configured to control the thermally managed powertrain system 1000 to accurately and consistently provide the required power level in a timely manner by monitoring and controlling the system with the HEATMS 1004. The HEATMS 1004 can be monitored and controlled via one or more computer system, such as a controller 2302 (FIG. 2), using non-transitory computer-readable storage media encoded with a computer program including instructions executable by a processor to create, operate, or run a HEATMS application 2300. In some embodiments, as schematically illustrated in FIG. 8, the HEATMS application 2300 can comprise a first sensor data module 2304 receiving sensor data from sensors 2306 that may be onboard the aircraft 10 (FIG. 1) and/or external or remote from the aircraft. A second power control module 2308 is coupled to the first module 2304 to receive the sensor data and to determine based on the sensor data, a peripheral electric power output; a primary electric power output; a battery power output, a pump power, a pump fluid flowrate, or any combination of the foregoing.

In some embodiments, the sensor data module 2304 is coupled to multiple sensors 2306 (e.g. piezoelectric, optical, radio, or other sensors) and/or components of the aircraft, and the sensed data received comprises, as an example, ambient air temperature, ambient air pressure, aircraft velocity, aircraft altitude, aircraft GNSS position, peripheral electric power unit output voltage, peripheral electric power unit output current, air inlet flow rate, air inlet temperature, air inlet pressure, air/water outlet flow rate, air/water outlet temperature, air/water outlet pressure, hydrogen inlet flow rate, hydrogen inlet temperature, hydrogen inlet pressure, speed reducer temperature, compressor inlet flow rate, compressor inlet temperature, compressor inlet pressure, compressor outlet flow rate, compressor outlet temperature, compressor outlet pressure, turbine inlet flow rate, turbine inlet temperature, turbine inlet pressure, turbine outlet flow rate, turbine outlet temperature, turbine outlet pressure, propeller rotational speed, radiator cooling fluid inlet temperature, radiator cooling fluid outlet temperature, Flight Management System (FMS) flight path, Flight Management System (FMS) status, or any combination thereof. In some embodiments, the module determines the peripheral electric power output, the primary electric power output, the battery power output, the pump power, the pump fluid flowrate, a pilot control, or any combination thereof from the sensor data, which may include sensor data by one or more machine learning algorithm.

Figure 9:
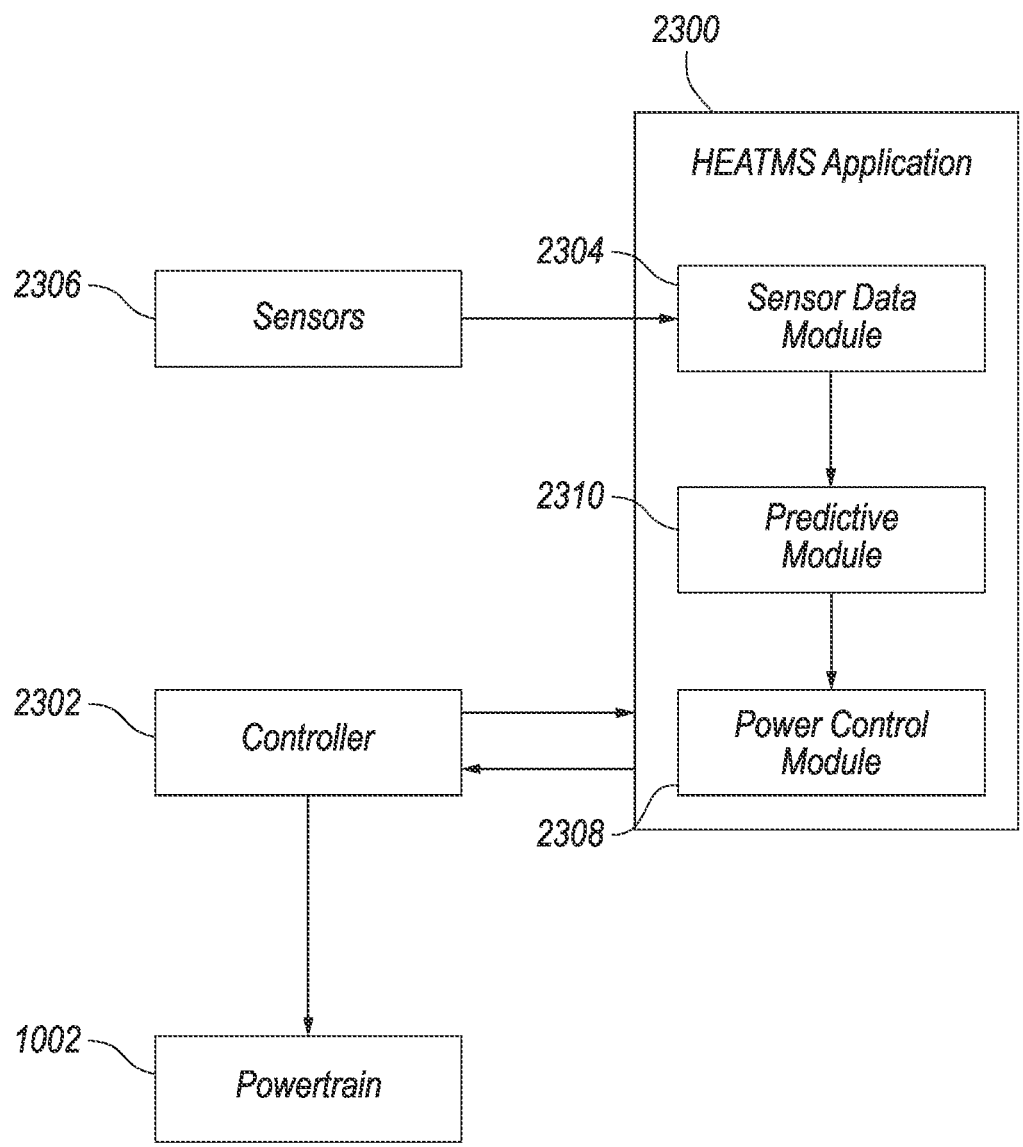
FIG. 9 is a schematic flowchart of a HEATMS application in accordance with some embodiments.
Figure 10:
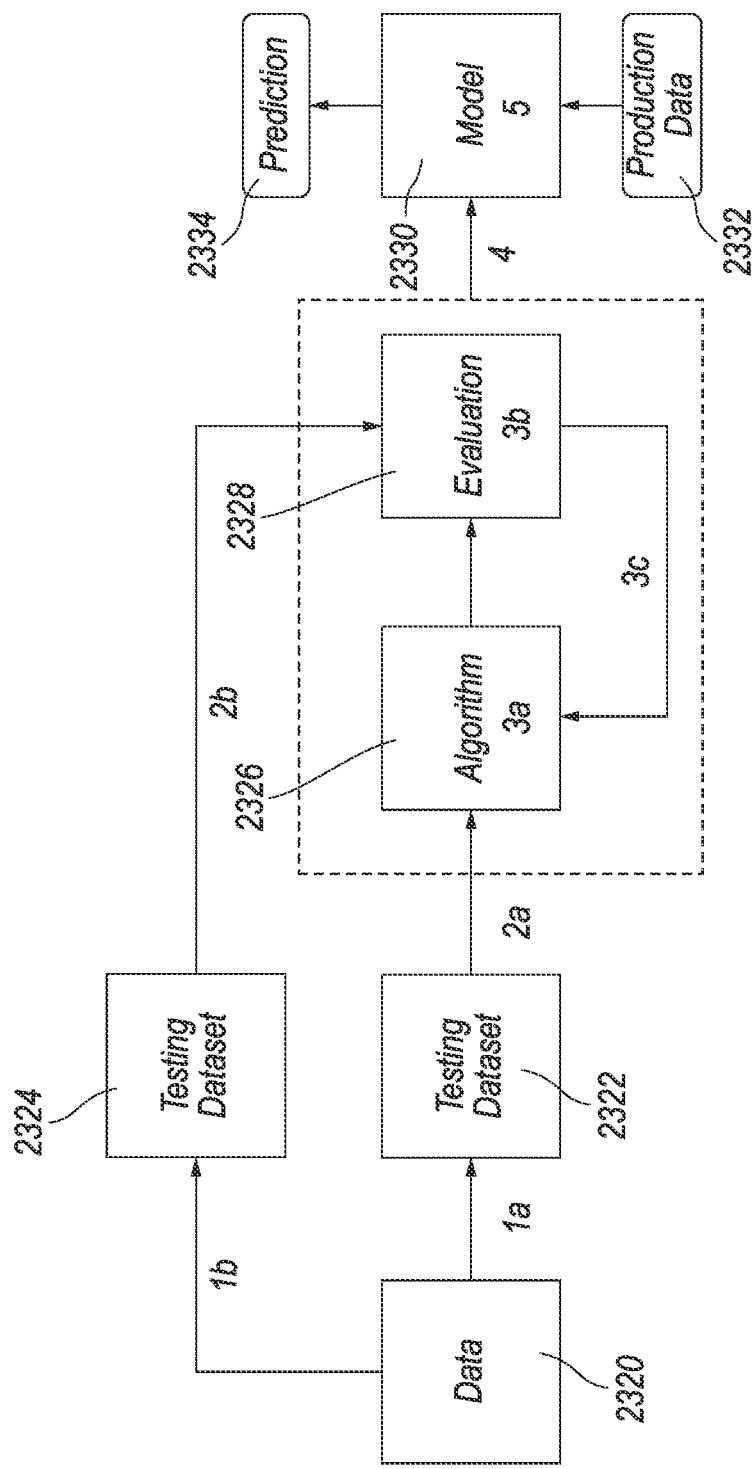
FIG. 10 is a schematic flowchart of a predictive module of the HEATMS application with machine learning in accordance with some embodiments.

In some embodiments, per FIG. 9, the HEATMS application 2300 can have a predictive module 2310 coupled to the first sensor data module 2304 and the power control module 2308, wherein the predictive module 2310 is configured to determine predicted flight events based on the sensed data. In some embodiments, the predictive module 2310 of the HEATMS application 2300 determines one or more predicted flight events from the sensed data by a machine learning algorithm. For example, as seen in FIG. 10, the predictive module 2310 can be configured to receive at 2320 the sensed data from the sensor data module, and provide the sensed data to a training dataset at 2322 and to a testing dataset at 2324. The training dataset is provided to the machine learning algorithm at 2326 for analysis, which provides the results for evaluation at 2328. The testing dataset is also provided to the machine learning algorithm for evaluation at 2328. The machine learning algorithm then outputs a model at 2320, which also receives production data at 2332, and the model outputs one or more predicted flight events at 2334. This prediction output can be used by the HEATMS application 2300 for control of the powertrain components. For example, the HEATMS application 2300 can determine the peripheral electric power output, the primary electric power output, the battery power output, the pump power, the pump fluid flowrate, or any combination thereof based on the predicted flight event. In some embodiments, the predicted flight event is a startup event, a taxi event, a takeoff event, a cruise event, a climb event, a descent event, a landing event, a shutdown event, or any combination thereof.

Figure 11:
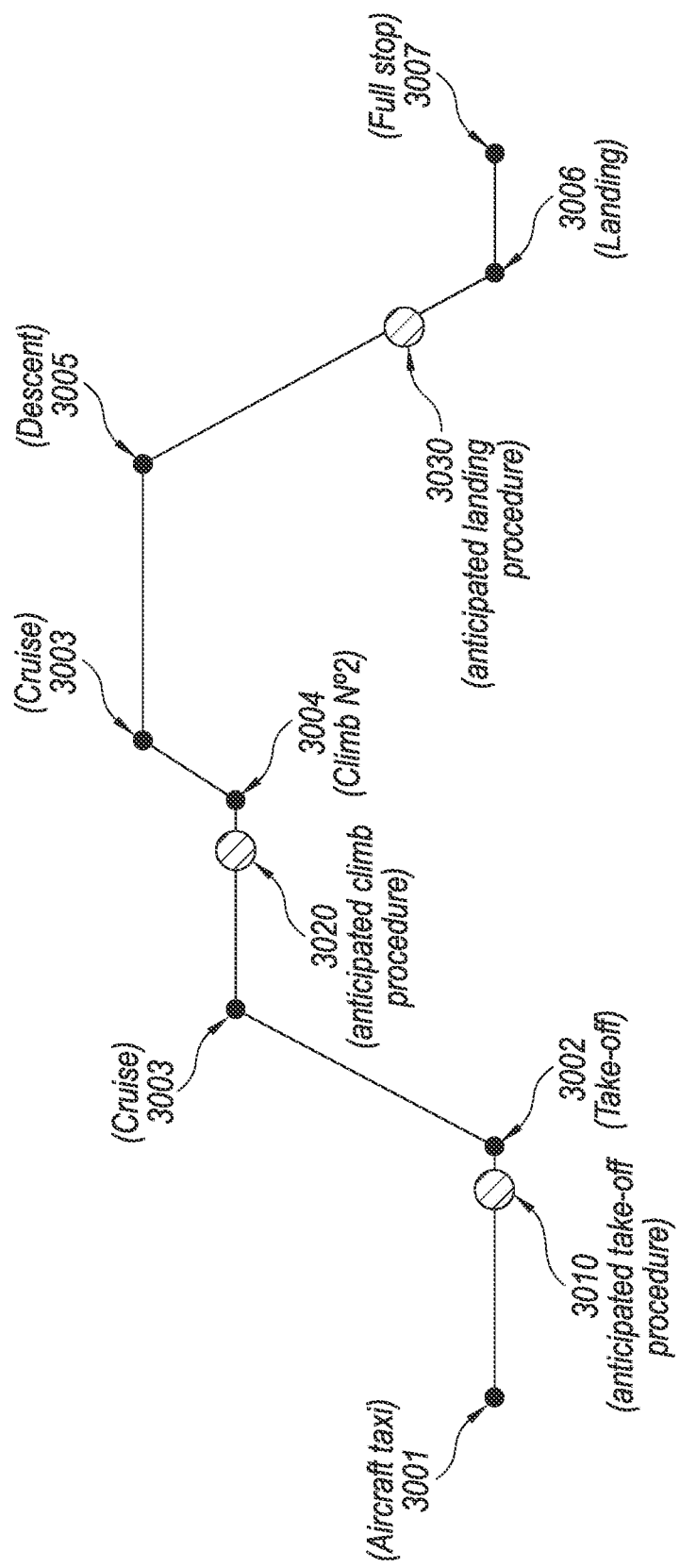
FIG. 11 shows a diagram of predicted flight events.

Per FIG. 11, the HEATMS application 2300 predicts a taxi event 3001, a take-off event 3002, a cruise event 3003, a climb event 3004, a descent event 3005, a landing event 3006, and a stop event 3007 based on the sensed data. In addition to predicting the event, the HEATMS application 2300 also predicts, based on the data sensed from the sensors the current power consumption, the anticipated power needs of the associated aircraft components or systems, and/or the timing of the power needs related to the current or predicted event. In some embodiments, once a take-off event 3002 is predicted, the HEATMS application 2300 begins an anticipated take-off procedure 3010 of increasing air flow rate to fuel cell stacks 2103. In some embodiments, once a climb event 3004 is predicted, the HEATMS application 2300 begins an anticipated climb procedure 3020 of increasing air flow rate to fuel cell stacks 2103. In some embodiments, once a landing event 3006 is predicted, the HEATMS application 2300 begins an anticipated landing procedure 3030 of increasing air flow rate to fuel cell stacks. The HEATMS application 2300 can also use other sensed system or component data and/or environmental data, operational data, etc., that can affect power needs and power usage in order to define the specific sequence or aspects of the anticipated procedure. In some embodiments, a procedure comprises one or more of the peripheral electric power outputs, the primary electric power output, the battery power output, the pump power, or the pump fluid flowrate.

In some embodiments, the HEATMS application 2300 increases a fluid flow rate entering the fuel cell stacks 2103 to increase its electrical power output based on immediate power needs and/or on the anticipated power needs predicted by the application. In some embodiments, to increase the fluid flow rate to the fuel cell stacks 2103, the HEATMS application 2300 increases the mechanical power transmitted to the first compressor 2112, the second compressor 2108, or both. In some embodiments, the first compressor 2112, the second compressor 2108, or both receive increased power based on an amount of power provided by the battery 2109, the peripheral electrical power unit 2110, or both. In some embodiments, the HEATMS application 2300 increases the amount of power provided by the battery 2109, the peripheral electrical power unit 2110, or both to increase the mechanical power transmitted to the first compressor 2112, the second compressor 2108, or both to increase a fluid flow rate entering the fuel cell stacks 2103 at a sufficiently fast rate to reduce any lag in electrical power output.

The HEATMS application 2300 can anticipate increases in the required fuel cell stack's electrical power output and controls the mechanical power transmitted to the first compressor 2112, the battery 2109, the peripheral electrical power unit 2110, or any combination thereof, to reduce the electrical power output lag. When the electrical power output of the fuel cell stacks 2103 is constant or predicted to be constant, it charges the battery 2109.

In some embodiments, the exhaust water or other fluid passing through the turbine 2104, the fuel cell stack 2103, or both may be released into the atmosphere, such as by spraying the exhaust water onto the radiator 2102 for evaporative cooling, as discussed above. Alternatively, the exhaust water or other exhaust fluid may be released through the exhaust 2107 of the fluid subsystem 2106 (FIG. 2). However, under certain atmospheric conditions, such an exhaust can form contrails, which are thought to contribute to global warming, such that prevention of contrails is desirable. Accordingly, the HEATMS application 2300 can be configured to determine the current and/or anticipated environmental, operational, and/or atmospheric conditions in which the aircraft will be operating, and to direct such fluid to the exhaust 2107 when the application determines, based at least in part on the anticipated environmental, operational, and/or atmospheric conditions, that contrails will not form. When the HEATMS application 2300 determines based at least in part on the anticipated environmental, operational, and/or atmospheric conditions that contrails will likely form, the application is configured to provide instructions to the water distribution system discussed above to activate the valves to block the exhaust water from the spray bar 2121 and to direct the exhaust fluid to a storage tank 2050 of the fluid storage subsystem 2106 for temporary storage, at least until the contrail conditions are no longer detected. In some embodiments, the HEATMS application 2300 can direct the fluid storage to release the fluid to the exhaust 2107 once non-contrail forming atmospheric conditions are detected. The HEATMS application is also configured to optimize the use of exhaust water not only to avoid contrails and for deicing, but also to maximize cooling performance by being able to temporarily store exhaust water when cooling demand is low, such as during a descent, such that the stored exhaust water can supplement the exhaust water generated in real time during an event when cooling demand is high, such as during a takeoff.

In some embodiments, the exhaust water and/or heated air or other fluid transmitted by fuel cell stack 2103, the turbine 2104, or both typically has a temperature in the range of about 65° C. and 85° C. In some embodiments, the HEATMS application 2300 determines the fluid temperature and other operational, environmental, or atmospheric conditions in which the aircraft is projected or anticipated to be operating, and the HEATMS application 2300 can direct some or a portion of the heated fluid to the spray bar 2121 and/or to one or more selected peripheral aircraft systems or components. For example, when the HEATMS application 2300 determines and/or predicts that the aircraft will be operating in conditions that can cause ice formation on the leading edges of the wings or other lift surfaces, the HEATMS application 2300 can activate the controller 2302 to direct the heated fluid from the fuel cell stack 2103, the turbine 2104, or both through a deicing system in the leading edge portion of the wings or other lift surface so as to deice the surface, or to prevent ice formation, or both. Such ice formation prevention can replace alternative dedicated conventional deicing components that would require electrical energy and add weight to a conventional aircraft system. In some embodiments, some or all of the heated exhaust water and the heated air generated by the fuel cell stack 2103 and the turbine 2104 can be directed to different portions or components of the aircraft. For example, heated exhaust water can be directed to the spray bars 2121 and other heated air can be captured and directed to one or more portions of the aircraft's deicing system.

In some embodiments, the HEATMS application 2300 can be configured to alter an amount of power transmitted to the peripheral electric power unit based on, for example, a motor rpm, motor torque, input voltage, input current, system temperature, or any combination thereof. In some embodiments, the HEATMS application can be configured to alter an amount of power transmitted to the primary electric power unit 2114 based on a motor rpm, motor torque, input voltage, input current, system temperature, or any combination thereof, and the current and/or predicted operating conditions and power needs of the aircraft's powertrain and other components.

Vehicles Comprising the Electro-Hydro-Thermal Management System

Another aspect provided herein, per FIG. 8, is a vehicle 2700 comprising the fuel cell stack 2102, the electric power unit 2103, the first compressor 2112, the second compressor 2108, and the peripheral power unit 2110. In some embodiments, the vehicle 2700 further comprises an electric motor inverter 2701. In some embodiments, the vehicle 2700 further comprises a radiator 2702. In some embodiments, the vehicle 2700 further comprises an auxiliary battery 2703. In some embodiments, the vehicle 2700 is an airplane.

The one or more vehicles may comprise, for example, airplanes and/or aircraft. The aircraft may comprise civilian turbojet aircraft of any size or category, e.g., wide-body turbojet aircraft, narrow-body turbojet aircraft, regional turbojet aircraft, and/or business turbojet aircraft. The aircraft may comprise civilian turboprop or piston powered aircraft of any size or category, e.g., regional turboprop and piston powered aircraft, commuter turboprop and piston powered aircraft, and/or any other type of turboprop or piston powered aircraft. The aircraft may comprise military turbojet aircraft of any size or category, or military turboprop and piston powered aircraft of any size or category. The aircraft may comprise aircraft configured for long-haul flights, medium-haul flights, and/or short-haul flights. In some cases, the aircraft may comprise, for example, commercial airplanes such as jumbo passenger jets, mid-size passenger jets, light passenger jets, passenger turboprops, and/or cargo airplanes. In other cases, the aircraft may comprise private jets including, for example, very light jets, light business jets, mid-size business jets, heavy business jets, or military jets. Alternatively, the aircraft may comprise private single engine planes, twin turboprop planes, aerobatic planes, or amphibious planes. In some cases, the aircraft may comprise a vertical takeoff and landing (VTOL) aircraft. In other cases, the aircraft may comprise one or more air taxis. The systems and methods of the present disclosure can be modified and/or adapted for use with any type of aircraft or aerial vehicle.

In some embodiments, the aircraft may comprise a rotorcraft such as a helicopter. The rotorcraft may be a multi-rotor craft that may include a plurality of rotors. The plurality of rotors may be capable of rotating to generate lift for the rotorcraft. The rotors may be propulsion units that may enable the rotorcraft to move about freely through the air. The rotors may rotate at the same rate and/or may generate the same amount of lift or thrust. The rotors may optionally rotate at varying rates, which may generate different amounts of lift or thrust and/or permit the rotorcraft to rotate. In some instances, one, two, three, four, five, six, seven, eight, nine, ten, or more rotors may be provided on a rotorcraft. The rotors may be arranged so that their axes of rotation are parallel to one another. In some instances, the rotors may have axes of rotation that are at any angle relative to one another, which may affect the motion of the rotorcraft.

The aircraft may be manned (i.e., operated by a passenger on or in the aircraft). The aircraft may be unmanned (i.e., operated by an individual who is not on or in the aircraft). The aircraft may be autonomous or semi-autonomous. The aircraft may be capable of responding to commands from a remote controller. The remote controller may not and need not be physically connected to the aircraft, and may communicate with the aircraft wirelessly from a distance. The aircraft may be capable of operating autonomously or semi-autonomously. The aircraft may be capable of following a set of pre-programmed instructions. The aircraft may operate semi-autonomously by responding to one or more commands from a remote controller while otherwise operating autonomously. For instance, one or more commands from a remote controller may initiate a sequence of autonomous or semi-autonomous actions by the aircraft in accordance with one or more parameters.

In some cases, the one or more vehicles 2000 may comprise a land-bound, underground, underwater, water surface, aerial, or space-based vehicle. The one or more vehicles 2000 may be configured to move within any suitable environment, such as in air (e.g., a fixed-wing aircraft, a rotary-wing aircraft, or an aircraft having neither fixed wings nor rotary wings such as a hot air balloon or a blimp), in water (e.g., a ship or a submarine), on ground (e.g., a motor vehicle, such as a car, truck, bus, van, motorcycle, bicycle, or a train), underground (e.g., a subway), in space (e.g., a spaceplane, a satellite, or a probe), or any combination of these environments.

The one or more vehicles may be capable of moving freely within the environment with respect to six axes of freedom (e.g., three axes of freedom in translation and three axes of freedom in rotation). Alternatively, the movement of the one or more vehicles can be constrained with respect to one or more axes of freedom, such as by a predetermined path, track, or orientation. The movement can be actuated by any suitable actuation mechanism, such as an engine, a motor, or a hydrogen electric propulsion system as described below. The actuation mechanism of the one or more vehicles can be powered by any suitable energy source, such as hydrogen, or any energy source derivable from hydrogen, such as electrical energy. The one or more vehicles may be self-propelled via a propulsion system, as described elsewhere herein.

In some instances, the one or more vehicles may be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. The propulsion system can be used to enable the one or more vehicles to take off from a surface, land on a surface, maintain its current position and/or orientation (e.g., hover), change orientation, and/or change position.

The propulsion system may comprise one or more propulsion mechanisms. The one or more propulsion mechanisms may comprise one or more of rotors, propellers, blades, engines, motors, wheels, axles, magnets, or nozzles. The vehicles described herein may have one or more, two or more, three or more, or four or more propulsion mechanisms. The propulsion mechanisms may all be of the same type. Alternatively, one or more propulsion mechanisms can be different types of propulsion mechanisms. The propulsion mechanisms can be mounted on the vehicle using any suitable means. The propulsion mechanisms can be mounted on any suitable portion of the vehicle, such as on the top, bottom, front, back, sides, or suitable combinations thereof.

In some embodiments, the propulsion mechanisms can enable the vehicle 2000 to take off vertically from a surface or land vertically on a surface without requiring any horizontal movement of the vehicle (e.g., without traveling down a runway). The movement of the one or more vehicles can be actuated by any suitable actuation mechanism, such as an engine or a motor. The actuation mechanism of the one or more vehicles can be powered by any suitable energy source, such as electrical energy generated using one or more fuel cells. The vehicle may be self-propelled via the propulsion system. One or more of the propulsion mechanisms may be controlled independently of the other propulsion mechanisms. Alternatively, the propulsion mechanisms can be configured to be controlled simultaneously.

The one or more vehicles can be controlled remotely by a user or controlled locally by an occupant within or on the one or more vehicles. In some embodiments, the one or more vehicles may be an unmanned movable object, such as a UAV. The unmanned movable object, such as a UAV, may not have an occupant onboard the unmanned movable object. The unmanned movable object can be controlled by a human or an autonomous control system (e.g., a computer control system), or any suitable combination thereof. The unmanned movable object can be an autonomous or semi-autonomous robot, such as a robot configured with an artificial intelligence.

The one or more vehicles can have any suitable size and/or dimensions. In some embodiments, the one or more vehicles may be of a size and/or dimensions to have a human occupant within or on the vehicle. Alternatively, the one or more vehicles may be of size and/or dimensions smaller than that capable of having a human occupant within or on the vehicle. In some instances, the one or more vehicles may have a maximum dimension (e.g., length, width, height, diameter, diagonal) that is about 1 m, 2 m, 3 m, 4 m, 5 m, 10 m, 20 m, 30 m, 40 m, 50 m, or greater. In some embodiments, the one or more vehicles can be configured to carry a load. The load can include one or more passengers, cargo, equipment, instruments, fuel storage modules, and the like.

Computer Systems

Figure 12:
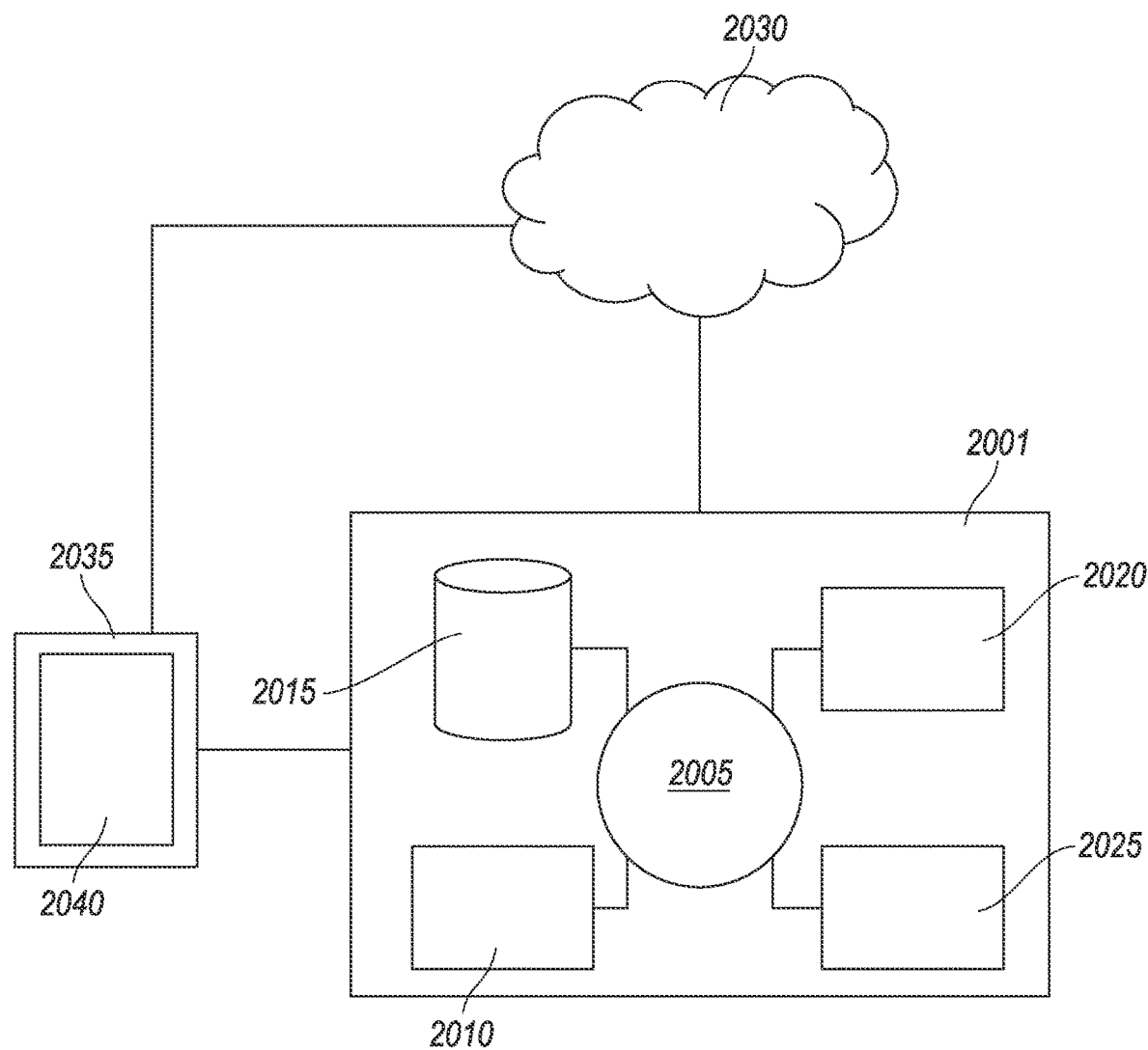
FIG. 12 schematically illustrates a computer system programmed or otherwise configured to implement methods provided herein.

FIG. 12 shows a computer system 2001 that is programmed or otherwise configured to implement a method for carbon-free transportation. The method may comprise determining a demand for hydrogen fuel storage modules and coordinating a delivery or a transportation of one or more hydrogen fuel storage modules to one or more hydrogen fuel compatible vehicles located at or near one or more vehicle fueling sites. The computer system 2001 can be an electronic device of a user or a computer system that is remotely located with respect to the electronic device. The electronic device can be a mobile electronic device.

The computer system 2001 may include a central processing unit (CPU, also "processor" and "computer processor" herein) 2005, which can be a single core or multi core processor, or a plurality of processors for parallel processing. The CPU 2005 or other portion of the computer system 2001 of one or more embodiments also has a real-time operating system configured execute instructions at defined times and in order. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020, and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet that is in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units that are located external to the computer system 2001 (e.g., on a remote server that is in communication with the computer system 2001 through an intranet or the Internet).

The computer system 2001 can communicate with one or more remote computer systems through the network 2030. For instance, the computer system 2001 can communicate with a remote computer system of a user (e.g., an operator of a hydrogen fuel compatible vehicle, an operator of a transport vehicle for transporting one or more hydrogen fuel storage modules, a technician at a hydrogen production facility, an entity managing a just-in-time network for hydrogen fuel cell delivery and distribution, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, which may be transmitted across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, a portal for monitoring a transportation or a usage of one or more hydrogen fuel storage modules. The portal may be provided through an application programming interface (API). A user or entity can also interact with various elements in the portal via the UI. Examples of UI's include, without limitation, a graphical user interface (GUI) and web-based user interface.

Databases

In some embodiments, the platforms, systems, media, and methods disclosed herein include one or more databases, or use of the same. In view of the disclosure provided herein, those of skill in the art will recognize that many databases are suitable for storage and retrieval of flight data, weather data, trajectory data, performance curves, or any other aerial information. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Machine Learning

In some embodiments, machine learning algorithms are utilized to aid in determining how much heat, water, coolant, oil, or any combination thereof to provide to the components of the thermally managed powertrain systems 1000. In some embodiments, machine learning algorithms are utilized to aid in determining at what speed or gear ratio to run the components of the thermally managed powertrain systems 1000. In some embodiments, machine learning algorithms employ an altitude, a speed, an external temperature, an internal temperature, or any combination thereof to determine the optimal operational parameters of the thermally managed powertrain systems 1000. In some embodiments, the machine learning algorithm is used to optimize the performance of the powertrain 1002 and/or the HEATMS 1004.

In some embodiments, the machine learning algorithms herein are taught based on data collected when testing the thermally managed powertrain systems 1000 or components thereof, one or more forms of labels, including but not limited to, human annotated labels and semi-supervised labels, distant supervision, regression modeling, or any combination thereof. The human annotated labels can be provided by a hand-crafted heuristic. The semi-supervised labels can be determined using a clustering. The semi-supervised labels can employ a XGBoost, a neural network, or both.

The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

In some embodiments, the machine learning algorithm utilizes regression modeling, wherein relationships between predictor variables and dependent variables are determined and weighted.

In some embodiments, a machine learning algorithm is used to select catalogue images and recommend project scope. A non-limiting example of a multi-variate linear regression model algorithm is seen below: probability=A0+ A1 (X1)+A2(X2)+A3(X3)+A4(X4)+A5(X5)+A6(X6)+A7 (X7) . . . wherein Ai (A1, A2, A3, A4, A5, A6, A7, . . . ) are "weights" or coefficients found during the regression modeling; and Xi (X1, X2, X3, X4, X5, X6, X7, . . . ) are data collected from the User. Any number of Ai and Xi variable can be included in the model. In some embodiments, the programming language "R" is used to run the model.

In some embodiments, training comprises multiple steps. In a first step, an initial model is constructed by assigning probability weights to predictor variables. In a second step, the initial model is used to "recommend" performance characteristics. At least one of the first step, the second step, and the third step can repeat one or more times continuously or at set intervals.

Terms and Definitions

Unless otherwise defined, all technical terms used herein have the same meaning as commonly understood by one of ordinary skill in the art to which this disclosure belongs.

The term "real time," as used herein, generally refers to a simultaneous or substantially simultaneous occurrence of a first event or action with respect to an occurrence of a second event or action. A real time action or event may be performed within a response time of less than one or more of the following: ten seconds, five seconds, one second, a tenth of a second, a hundredth of a second, a millisecond, or less relative to at least another event or action. A real-time action may be performed by one or more computer processors.

Whenever the term "at least," "greater than," or "greater than or equal to" precedes the first numerical value in a series of two or more numerical values, the term "at least," "greater than," or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less than the stated percentage by 10%, 5%, or 1%, including increments therein.

As used herein, the phrases "at least one", "one or more," and "and/or" are open-ended expressions that are both conjunctive and disjunctive in operation. For example, each of the expressions "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B and C together.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

We claim:

1. A method for optimizing operation of an aerial vehicle having a hydrogen-powered hybrid electric powertrain, the method comprising:

providing hydrogen fuel to one or more fuel cell stacks;

directing a first amount of air to the one or more fuel cell stacks powered by the hydrogen fuel and generating a first output of electrical power for use at least by an electric motor of the hydrogen-powered hybrid electric powertrain;

operating the electric motor using the generated electrical power, wherein the generated electrical power is provided to the electric motor without passing through a DC-to-DC converter and/or being stored in a battery;

predicting one or more changes in an electrical power demand of the powertrain during operation of the electric motor;

controlling an amount of air flow to the one or more fuel cell stacks to direct a second amount of air to the one or more fuel cell stacks based at least in part on the one or more predicted changes in the electrical power demand of the powertrain, wherein the first amount of air is different than the second amount of air provided to the one or more fuel cell stacks; and providing the second amount of air to the one or more fuel cell stacks before occurrence of the predicted electrical power demand for generation of a second output of electrical power by the one or more fuel cell stacks at or before occurrence of the predicted electrical power demand of the powertrain, wherein the second output of electrical power is different than the first output of electrical power, thereby reducing a transient period for delivery of the electrical power to the electric motor of the powertrain;

wherein predicting one or more changes in an electrical power demand of the powertrain is based at least in part on one or more of the following:

one or more inputs from a pilot of the aerial vehicle;

a current, previous, or next position of the aerial vehicle;

a flight path comprising a plurality of spatial coordinates; or atmospheric weather conditions.

2. The method of claim 1 wherein the amount of air flow is controlled in part by controlling mechanical power to one or more compressors that direct airflow toward the one or more fuel cell stacks.

3. The method of claim 2 wherein the one or more compressors are powered at least partially by a peripheral electrical power unit.

4. The method of claim 1 wherein the second amount of air is provided to the one or more fuel cell stacks at a time so the one or more fuel cell stacks provides sufficient electrical power to meet the predicted electrical power demand before the occurrence of the predicted demand of the electrical power output.

5. A method for optimizing operation of an aerial vehicle having a hydrogen-powered hybrid electric powertrain, the method comprising:

providing hydrogen fuel to one or more fuel cell stacks;

directing a first amount of air to the one or more fuel cell stacks powered by the hydrogen fuel and generating a first output of electrical power for use at least by an electric motor of the hydrogen-powered hybrid electric powertrain;

operating the electric motor using the generated electrical power, wherein the generated electrical power is provided to the electric motor without passing through a DC-to-DC converter and/or being stored in a battery;

predicting one or more changes in an electrical power demand of the powertrain during operation of the electric motor;

controlling an amount of air flow to the one or more fuel cell stacks to direct a second amount of air to the one or more fuel cell stacks based at least in part on the one or more predicted changes in the electrical power demand of the powertrain, wherein the first amount of air is different than the second amount of air provided to the one or more fuel cell stacks; and providing the second amount of air to the one or more fuel cell stacks before occurrence of the predicted electrical power demand for generation of a second output of electrical power by the one or more fuel cell stacks at or before occurrence of the predicted electrical power demand of the powertrain, wherein the second output of electrical power is different than the first output of electrical power, thereby reducing a transient period for delivery of the electrical power to the electric motor of the powertrain wherein the one or more fuel cell stacks and the electric motor are coupled to one or more radiators for dissipating heat generated at least by the one or more fuel cell stacks and the electric motor, and wherein the one or more fuel cell stacks generate exhaust water when generating the electrical power, the method further comprises applying the exhaust water to the one or more radiators for evaporative cooling for dissipation of the heat generated at least by the one or more fuel cell stacks and the electric motor.

6. The method of claim 5 wherein applying exhaust water to the one or more radiators comprises spraying the exhaust water onto the one or more radiators.

7. A method for optimizing operation of an aerial vehicle having a hydrogen-powered hybrid electric powertrain, the method comprising:

providing hydrogen fuel to one or more fuel cell stacks;

directing a first amount of air to the one or more fuel cell stacks powered by the hydrogen fuel and generating a first output of electrical power for use at least by an electric motor of the hydrogen-powered hybrid electric powertrain;

operating the electric motor using the generated electrical power, wherein the generated electrical power is provided to the electric motor without passing through a DC-to-DC converter and/or being stored in a battery;

predicting one or more changes in an electrical power demand of the powertrain during operation of the electric motor;

controlling an amount of air flow to the one or more fuel cell stacks to direct a second amount of air to the one or more fuel cell stacks based at least in part on the one or more predicted changes in the electrical power demand of the powertrain, wherein the first amount of air is different than the second amount of air provided to the one or more fuel cell stacks;

providing the second amount of air to the one or more fuel cell stacks before occurrence of the predicted electrical power demand for generation of a second output of electrical power by the one or more fuel cell stacks at or before occurrence of the predicted electrical power demand of the powertrain, wherein the second output of electrical power is different than the first output of electrical power, thereby reducing a transient period for delivery of the electrical power to the electric motor of the powertrain;

using at least one of (1) one or more sensors onboard the aerial vehicle, and (2) data and automated observations from one or more other aircrafts, detecting a first set of atmospheric conditions in an aircraft-operating environment that indicates contrail formation from the aerial vehicle would occur upon release in the environment of exhaust water generated by one or more fuel cell stacks; and temporarily storing the exhaust water onboard the aerial vehicle to block the contrail formation as the aerial vehicle is navigating through the environment during first set of atmospheric conditions.

8. The method of claim 7, further comprising:

detecting a second set of atmospheric conditions in the environment in which it is unlikely to cause contrail formation from the aerial vehicle; and releasing the stored exhaust water from the aerial vehicle into the environment as the aerial vehicle is navigating through the environment without forming a contrail.

9. A method for optimizing operation of an aerial vehicle having a hydrogen-powered hybrid electric powertrain, the method comprising:

providing hydrogen fuel to one or more fuel cell stacks;

directing a first amount of air to the one or more fuel cell stacks powered by the hydrogen fuel and generating a first output of electrical power for use at least by an electric motor of the hydrogen-powered hybrid electric powertrain;

operating the electric motor using the generated electrical power, wherein the generated electrical power is provided to the electric motor without passing through a DC-to-DC converter and/or being stored in a battery;

predicting one or more changes in an electrical power demand of the powertrain during operation of the electric motor;

controlling an amount of air flow to the one or more fuel cell stacks to direct a second amount of air to the one or more fuel cell stacks based at least in part on the one or more predicted changes in the electrical power demand of the powertrain, wherein the first amount of air is different than the second amount of air provided to the one or more fuel cell stacks;

providing the second amount of air to the one or more fuel cell stacks before occurrence of the predicted electrical power demand for generation of a second output of electrical power by the one or more fuel cell stacks at or before occurrence of the predicted electrical power demand of the powertrain, wherein the second output of electrical power is different than the first output of electrical power, thereby reducing a transient period for delivery of the electrical power to the electric motor of the powertrain;

directing heat generated by the one or more fuel cell stacks to one or more surface portions of the aerial vehicle; and using the directed heat to prevent ice formation at the one or more surface portions of the aerial vehicle.

* * * * *